(12) United States Patent
Ianev et al.

(10) Patent No.: US 12,414,038 B2
(45) Date of Patent: Sep. 9, 2025

(54) AMF APPARATUS, ACCESS NETWORK NODE, AND METHODS THEREFOR

(71) Applicant: NEC Corporation, Tokyo (JP)

(72) Inventors: Iskren Ianev, Reading (GB); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 844 days.

(21) Appl. No.: 17/628,730

(22) PCT Filed: Mar. 18, 2021

(86) PCT No.: PCT/JP2021/011214
§ 371 (c)(1),
(2) Date: Jan. 20, 2022

(87) PCT Pub. No.: WO2021/200239
PCT Pub. Date: Oct. 7, 2021

(65) Prior Publication Data
US 2022/0322221 A1   Oct. 6, 2022

(30) Foreign Application Priority Data
Apr. 2, 2020 (JP) .................. 2020-067097

(51) Int. Cl.
H04W 48/18 (2009.01)
H04W 76/15 (2018.01)

(52) U.S. Cl.
CPC .......... *H04W 48/18* (2013.01); *H04W 76/15* (2018.02)

(58) Field of Classification Search
CPC ..... H04W 48/18; H04W 76/15; H04W 36/08; H04W 76/11
(Continued)

(56) References Cited

U.S. PATENT DOCUMENTS

2018/0317163 A1   11/2018   Lee et al.
2018/0352491 A1   12/2018   Shih et al.
(Continued)

FOREIGN PATENT DOCUMENTS

CN   109429274 A   3/2019
CN   109561485 A   4/2019
(Continued)

OTHER PUBLICATIONS

Office Action for EP Application No. 21779047.6, mailed on Sep. 28, 2022 with English Translation.
(Continued)

*Primary Examiner* — Huy C Ho
(74) *Attorney, Agent, or Firm* — Sughrue Mion, PLLC

(57) ABSTRACT

An AMF apparatus (3) receives a NAS message for requesting a core network to establish or activate a PDU session associated with an allowed network slice identifier, from a UE (4), via a first cell (10) not supporting the allowed network slice identifier and via a first AN node (1) that provides the first cell (10). In response to receiving the NAS message, the AMF apparatus (3) sends to the first AN node (1) a control message that causes the first AN node (1) to move the UE (4) to a second cell (20) that supports the allowed network slice identifier. This can contribute, for example, to enabling an establishment or activation of a PDU session associated with a network slice that is supported only in sparsely (or patchily) placed local cells.

25 Claims, 24 Drawing Sheets

(58) Field of Classification Search
USPC .................................................. 370/329
See application file for complete search history.

(56) References Cited

U.S. PATENT DOCUMENTS

| | | | |
|---|---|---|---|
| 2019/0029065 A1* | 1/2019 | Park | H04W 60/00 |
| 2020/0022095 A1 | 1/2020 | Kim et al. | |
| 2020/0037214 A1* | 1/2020 | Jin | H04W 36/00835 |

FOREIGN PATENT DOCUMENTS

| | | |
|---|---|---|
| CN | 109862579 A | 6/2019 |
| EP | 3589016 A1 | 1/2020 |

OTHER PUBLICATIONS

Intel Corporation: "Slice based cell reselection", 3GPP Draft; R2-1802958, Feb. 16, 2018, pp. 1-3.
Japanese Office Action for JP Application No. 2022-511899 mailed on Feb. 21, 2023 with English Translation.
China Telecom, "On Allowed NSSAI in NG-RAN", 3GPP TSG-RAN3 #99bis, R3-181891, Apr. 5, 2018.
"3rd Generation Partnership Project; Technical Specification Group Services and System Aspects; Procedures for the 5G System (5GS); Stage 2 (Release 15)", 3GPP TS 23.502 V15.9.0 (Mar. 2020), Mar. 27, 2020.
Huawei, HiSilicon, Nokia, Nokia Shanghai Bell, Oppo, Ericsson, "Storage of allowed NSSAI for PLMNs in TAI list", 3GPP TSG-CT WG1 Meeting #121, C1-198929, Nov. 18, 2019.
CN Office Action for CN Application No. 202180027235.8, mailed on Aug. 29, 2024 with English Translation.
International Search Report for PCT Application No. PCT/JP2021/011214, mailed on Jun. 15, 2021.
3GPP TS 23.501 V16.3.0 (Dec. 2019) "3rd Generation Partnership Project; Technical Specification Group Services and System Aspects; System Architecture for the 5G System (SGS): Stage 2 (Release 16)", Dec. 2019, pp. 1-417.
3GPP TS 23.502 V16.3.0 (Dec. 2019) "3rd Generation Partnership Project; Technical Specification Group Services and System Aspects; Procedures for the 5G System (5GS); Stage 2 (Release 16)", Dec. 2019, pp. 1-558.
S2-1908583, Nokia et al., "New WID Study on Enhancement of Network Slicing Phase 2". 3GPP TSG-SA WG2 Meeting #134, Sapporo, Japan, Jun. 24-28, 2019, pp. 1-3.
RP-193254, CMCC et al., "Study on enhancement of RAN Slicing", 3GPP TSG-RAN meeting #86, Sitges, Barcelona, Dec. 9-12, 2019, pp. 1-4.
S2-2001467, Samsung et al., "Key Issue on 5GC assisted cell selection to access network slice", 3GPP TSG-SA WG2 Meeting #136 Ad-hoc, Incheon, Korea, Jan. 13-17, 2020, pp. 1-4.
RP-192599, CMCC, "Second round email discussion for R17 proposals on slicing", 3GPP TSG RAN #86, Dec. 9-12, 2019, pp. 1-32.
S2-2003629, NEC, KI#7 New Sol#X: "Steering the UE to a network slice in a different frequency band", 3GPP TSG SA WG2 #139E. Jun. 1-12, 2020, pp. 1-3.

* cited by examiner

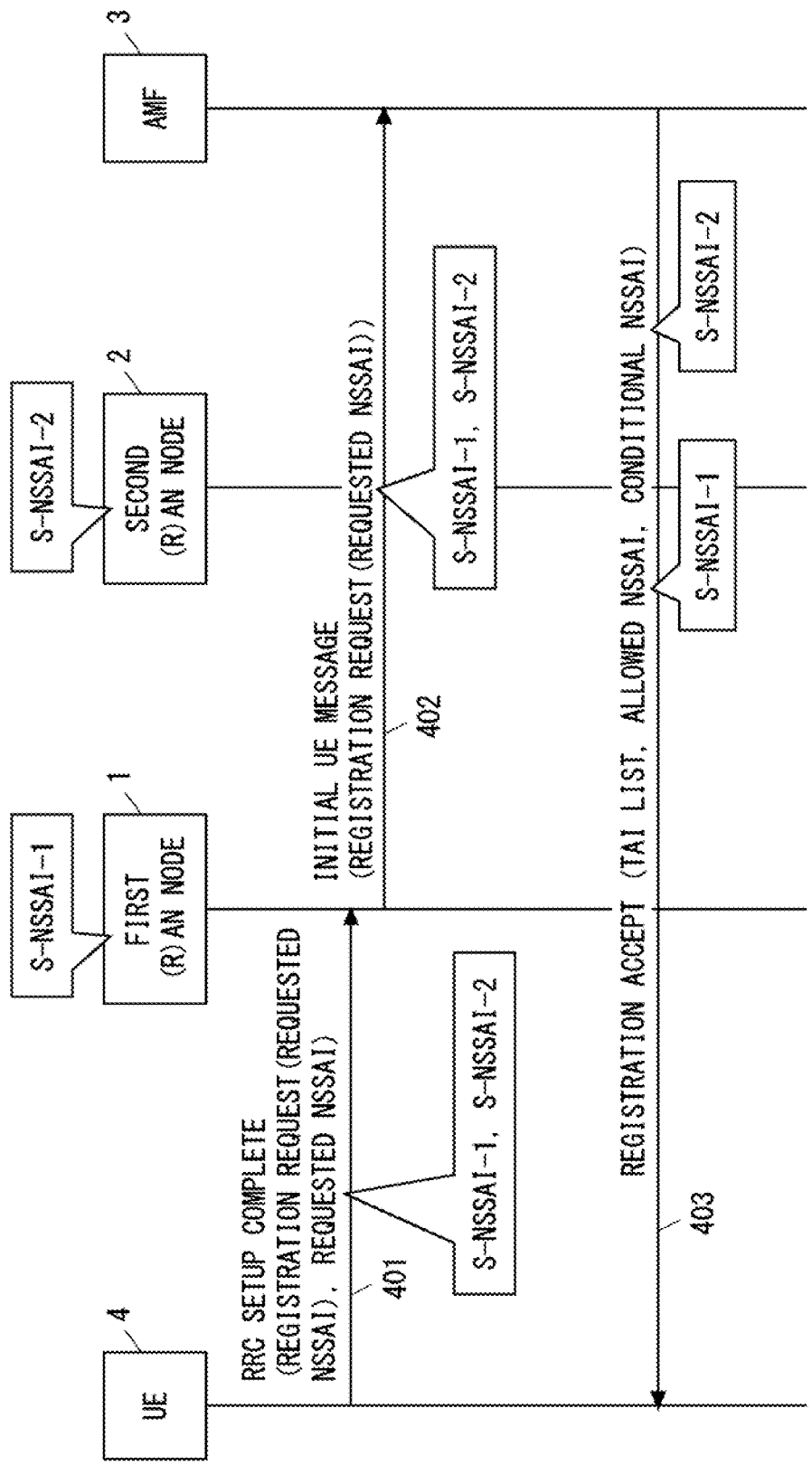

AMF APPARATUS, ACCESS NETWORK NODE, AND METHODS THEREFOR

This application is a National Stage Entry of PCT/JP2021/011214 filed on Mar. 18, 2021, which claims priority from Japanese Patent Application 2020-067097 filed on Apr. 2, 2020, the contents of all of which are incorporated herein by reference, in their entirety.

TECHNICAL FIELD

The present disclosure relates to a radio communication network, especially network slicing.

BACKGROUND ART

The 5G system (5GS) supports network slicing (see, for example, Non-Patent Literature 1 and 2, especially Section 5.15 of Non-Patent Literature 1). Network slicing makes it possible to create multiple logical networks or non-virtualized logical networks on top of physical networks. For example, network slicing may use Network Function Virtualization (NFV) and software-defined networking (SDN) technologies to create multiple virtualized logical networks on top of physical networks. Each logical network is called a network slice. A network slices provides specific network capabilities and network characteristics. In order to form a single network slice, a network slice instance (NSI) is defined as a set of network function (NF) instances, resources (e.g., computer processing resources, storage, and networking resources), and an access network (AN) (one or both of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to the expected network slice behavior in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra Reliable and Low Latency Communication (URLLC), Massive Internet of Things (MIoT), and Vehicle to Everything (V2X) slice types. Anon-standard value of an S-NSSAI with identifies a single network slice within a specific Public Land Mobile Network (PLMN). In other words, non-standard values are PLMN-specific values, and associated with the PLMN ID of a PLMN that has assigned them. Each S-NSSAI ensures network isolation by selecting a particular NSI. A NSI may be selected via different S-NSSAIs. An S-NSSAI may be associated with different NSIs. A network slice may be uniquely identified by an S-NSSAI.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

A Configured NSSAI includes one or more S-NNSAIs each applicable to one or more PLMNs. For example, The Configured NSSAI is configured by a Serving PLMN and is applied to the Serving PLMN. Alternatively, the Configured NSSAI may be a Default Configured NSSAI. The Default Configured NSSAI is configured by the Home PLMN (HPLMN) and applies to any PLMNs for which no specific Configured NSSAI has been provided. For example, a radio terminal (User Equipment (UE)) is provisioned with the Default Configured NSSAI from a Unified Data Management (UDM) of the HPLMN via an Access and Mobility Management Function (AMF).

A Requested NSSAI is signaled by a UE to a network in, for example, a registration procedure, allowing the network to determine a serving AMF, at least one network slice and at least one NSIs, for this UE.

An allowed NSSAI is provided to a UE by a Serving PLMN and indicates one or more S-NSSAIs that the UE can use in the current Registration Area of the Serving PLMN. The Allowed NSSAI is determined by an AMF of the Serving PLMN, for example, during a registration procedure. Accordingly, the Allowed NSSAI is signaled to the UE by the network (i.e., AMF) and stored in memories (e.g., non-volatile memories) of both the AMF and the UE.

A Rejected NSSAI includes one or more S-NSSAIs rejected by the current PLMN. The Rejected NSSAI may be referred to as rejected S-NSSAIs. A S-NSSAI is rejected throughout the current PLMN or rejected in the current registration area. If an AMF rejects any of one or more S-NSSAIs included in the Requested NSSAI, for example, in a registration procedure of a UE, it includes them in the Rejected NSSAI. The Rejected NSSAI is signaled to the UE by the network (i.e., AMF) and stored in memories of both the AMF and the UE.

A Pending NSSAI indicates one or more S-NSSAIs for which Network Slice-Specific Authentication and Authorization (NSSAA) is pending. A Serving PLMN shall perform NSSAA for S-NSSAIs of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines an Allowed NSSAI as described above during a registration procedure of a UE, it does not include S-NSSAIs subject to NSSAA in the Allowed NSSAI, but instead them in the Pending NSSAI. The Pending NSSAI is signaled to the UE by the network (i.e., AMF) and stored in memories of both the AMF and the UE.

The 3rd Generation Partnership Project (3GPP) will discussions on Release 17 in the first quarter of 2020. Enhancements to network slices will be discussed for Release 17 (see, for example, Non-Patent Literature 3, 4, and 5). Non-Patent Literature 3 proposes that a study is needed to support parameters contained in the Generic Slice Template (GST), proposed by the GSM Association, in the 5GS. Non-Patent Literature 4 proposes that it is necessary to study a mechanism for enabling a User Equipment (UE) to quickly access a cell that supports an intended slice. Non-Patent Literature 5 points out an issue that according to the current 3GPP specification, a UE needs to select an NG-RAN node to perform a registration procedure without knowing which NG-RAN node supports which network slice. Non-Patent Literature 5 proposes that it is necessary to consider how to select a particular cell that can be used to access the intended network slice.

CITATION LIST

Non Patent Literature

[Non-Patent Literature 1] 3GPP TS 23.501 V16.3.0 (2019-12) "3rd Generation Partnership Project; Technical Specification Group Services and System Aspects; System Architecture for the 5G System (5GS); Stage 2 (Release 16)", December 2019

[Non-Patent Literature 2] 3GPP TS 23.502 V16.3.0 (2019-12) "3rd Generation Partnership Project; Technical Specification Group Services and System Aspects; Procedures for the 5G System (5GS); Stage 2 (Release 16)", December 2019

[Non-Patent Literature 3] Nokia, Nokia Shanghai Bell, ZTE, Sanechips, Telecom Italia, Sprint, NEC, KDDI; Deutsche Telekom, InterDigital, Orange, Vodafone, Verizon UK Ltd, UIC, ETRI, Broadcom, Lenovo, Cisco, Telefonica S. A., Huawei, China Mobile, CATT, " New WID Study on Enhancement of Network Slicing Phase 2", S2-1908583, 3GPP TSG-SA WG2 Meeting # 134, Sapporo, Japan, 24-28 Jun. 2019

[Non-Patent Literature 4] CMCC, Verizon, " Study on enhancement of RAN Slicing", RP-193254, 3GPP TSG-RAN meeting # 86, Sitges, Barcelona, 9-12 Dec. 2019

[Non-Patent Literature 5] Samsung, AT&T, Sprint, InterDigital, China Mobile, SK Telecom, Convida Wireless, ZTE, Apple, KDDI, " Key Issue on 5GC assisted cell selection to access network slice", S2-2001467, 3GPP TSG-SA WG2 Meeting # 136 Ad-hoc, Incheon, Korea, 13-17 Jan. 2020

SUMMARY OF INVENTION

Technical Problem

According to the current 3GPP specifications, an NG-RAN node notifies an Access and Mobility management Function (AMF) in a 5G Core Network (5GC) of network slices supported by the NG-RAN node. More specifically, the NG-RAN node provides the AMF with a Supported TA List Information Element (IE) and a TAI Slice Support List IE, during a procedure for setting up application-level configuration data required to interwork with the AMF on a control-plane interface (i.e., N2 (or NG-C) interface). The Supported TA List IE indicates the Tracking Areas (TAs) supported in the NG-RAN node. The TAI Slice Support List IE is contained in the Supported TA List IE and indicates supported S-NSSAIs per TA (or per Tracking Area Identity (TAI)). A Single Network Slice Selection Assistance Information (S-NSSAI) is an identifier of a network slice. Accordingly, the AMF knows the TAs supported by the NG-RAN node having an established N2 interface and also knows the S-NSSAIs supported by each TA supported by the NG-RAN node.

Furthermore, according to the current 3GPP specifications, all the S-NSSAIs included in an Allowed NSSAI must be available in all the TAs that make up a registration area. The registration area of a UE is a list of one or more TAs (TAIs). From a UE perspective, the network slices allowed for the UE are homogeneously supported, at least within the registration area indicated by the AMF.

The inventors have studied network slicing and found various issues. One of them concerns a use case where a network slice (e.g., S-NSSAI # 2) for a specific communication service (e.g., URLLC) is provided in cells in a higher frequency band (e.g., a millimeter wave band, 28 GHz). However, considering millimeter wave propagation characteristics, the cells of the higher frequency band may be local cells that sparsely (or patchily) placed within a cell that is operated in a lower frequency band (e.g., sub-6 GHz) and associated with another network slice (e.g., S-NSSAI # 1).

Consider the case where the UE selects the lower frequency cell for a registration procedure to the 5GC and requests a network slice (e.g., S-NSSAI # 2) that is not supported by a NG-RAN node providing the lower frequency cell. In this case, according to the current 3GPP specifications, the AMF in the 5GC knows that S-NSSAI # 2 is not supported in the TA to which the lower frequency cell, which the UE is camping on, belongs, and therefore will not allow S-NSSAI # 2 to the UE. Accordingly, if the UE finds another cell (e.g., higher frequency cell) that does not belong to the registration area (i.e., list of TAIs) indicated by the AMF, the UE needs to reselect the cell and perform an additional registration request procedure via this cell in order to use the intended service (e.g., URLLC) and network slice (e.g., S-NSSIA # 2).

In addition, another issue concerns a case where a Master Node (MN) of Dual Connectivity (DC) does not support a network slice (e.g., S-NSSIA # 2) that the UE intends to use, while a Secondary Node (SN) support it. Consider the case where the UE selects a candidate MN for a registration procedure to the 5GC and requests a network slice (e.g., S-NSSAI # 2) that is not supported by the candidate MN but is supported by a candidate SN. The candidate MN means an NG-RAN node that can operate as an MN in DC, while the candidate SN means an NG-RAN node that can operate as an SN in DC. In this case, according to the current 3GPP specifications, the AMF knows that the candidate MN does not support S-NSSAI # 2 and will therefore not allow S-NSSAI # 2 to the UE. If S-NSSAI # 2 is only available in a specific frequency band (e.g., 28 GHz) and that specific frequency band is deployed only under an SN in DC, then the UE may not be able to use services provided via NSSAI # 2.

These issues are related to a restriction on the registration area of the UE. As mentioned above, according to the current 3GPP specifications, all the S-NSSAIs included in the Allowed NSSAI must be available in all the TAs that make up the registration area. Relaxing this restriction may allow the UE to easily utilize a network slice that are only supported in sparsely (or patchily) placed local cells, for example. Moreover, it is unclear how to establish or activate a protocol data unit (PDU) session associated with a limitedly supported network slice if the restriction on the registration area is relaxed.

One of the objects to be attained by embodiments disclosed herein is to provide apparatuses, methods, and programs that contribute to enabling an establishment or activation of a PDU session associated with a network slice that is supported only in sparsely (or patchily) placed local cells. It should be noted that this object is merely one of the objects to be attained by the embodiments disclosed herein. Other objects or problems and novel features will be made apparent from the following description and the accompanying drawings.

Solution to Problem

In an aspect, an AMF apparatus includes at least one memory and at least one processor coupled to the at least one memory. The at least one processor is configured to receive a Non-Access Stratum (NAS) message for requesting a core network to establish or activate a protocol data unit (PDU) session associated with an allowed network slice identifier, from a User Equipment (UE), via a first cell not supporting the allowed network slice identifier and via a first access network (AN) node that provides the first cell. The at least one processor is further configured to, in response to receiving the NAS message, send to the first AN node a control message that causes the first AN node to move the UE to a second cell that supports the allowed network slice identifier or add the second cell as a secondary cell for the UE.

In an aspect, an AN node includes at least one memory and at least one processor coupled to the at least one memory. The at least one processor is configured to receive a Non-Access Stratum (NAS) message sent from a User Equipment (UE) for requesting a core network to establish or activate a protocol data unit (PDU) session associated with an allowed network slice identifier, via a first cell not supporting the allowed network slice identifier. The at least one processor is further configured to forward the NAS message to the core network and then receive from the core network a control message that causes the first AN node to move the UE to a second cell that supports the allowed network slice identifier or add the second cell as a secondary cell for the UE. Furthermore, the at least one processor is configured to, in response to the control message, hand over or redirect the UE to the second cell supporting the allowed network slice identifier, or add the second cell as a secondary cell of carrier aggregation or dual connectivity for the UE.

In an aspect, a method performed by an AMF apparatus includes the following steps:
(a) receiving a Non-Access Stratum (NAS) message for requesting a core network to establish or activate a protocol data unit (PDU) session associated with an allowed network slice identifier, from a User Equipment (UE), via a first cell not supporting the allowed network slice identifier and via a first access network (AN) node that provides the first cell; and
(b) sending a control message to the first AN node in response to receiving the NAS message, the control message causing the first AN node to move the UE to a second cell that supports the allowed network slice identifier or add the second cell as a secondary cell for the UE.

In an aspect, a method performed by an AN node includes the following steps:
(a) receiving a Non-Access Stratum (NAS) message sent from a User Equipment (UE) for requesting a core network to establish or activate a protocol data unit (PDU) session associated with an allowed network slice identifier, via a first cell not supporting the allowed network slice identifier;
(b) forwarding the NAS message to the core network;
(c) receiving a control message from the core network, the control message causing the first AN node to move the UE to a second cell that supports the allowed network slice identifier or add the second cell as a secondary cell for the UE; and
(d) in response to the control message, handing over or redirecting the UE to the second cell supporting the allowed network slice identifier, or adding the second cell as a secondary cell of carrier aggregation or dual connectivity for the UE.

In an aspect, a program includes instructions (software codes) that, when loaded into a computer, cause the computer to perform the method according to any one of the above-described aspects.

Advantageous Effects of Invention

According to the above-described aspects, it is possible to provide apparatuses, methods, and programs that contribute to enabling an establishment or activation of a PDU session associated with a network slice that is supported only in sparsely (or patchily) placed local cells.

BRIEF DESCRIPTION OF DRAWINGS

FIG. 4 is a sequence diagram showing an example of signaling according to an aspect.

DESCRIPTION OF EMBODIMENTS

Specific aspects will be described hereinafter in detail with reference to the drawings. The same or corresponding elements are denoted by the same symbols throughout the drawings, and duplicated explanations are omitted as necessary for the sake of clarity.

Each of the aspects described below may be used individually, or two or more of the aspects may be appropriately combined with one another. These aspects include novel features different from each other. Accordingly, these aspects contribute to attaining objects or solving problems different from one another and contribute to obtaining advantages different from one another.

The following descriptions on the aspects mainly focus on the 3rd Generation Partnership Project (3GPP) fifth generation mobile communication system (5G system (5GS)). However, these aspects may be applied to other radio communication systems that support network slicing similar to that of the 5GS.

First Aspect

Figure 1A:
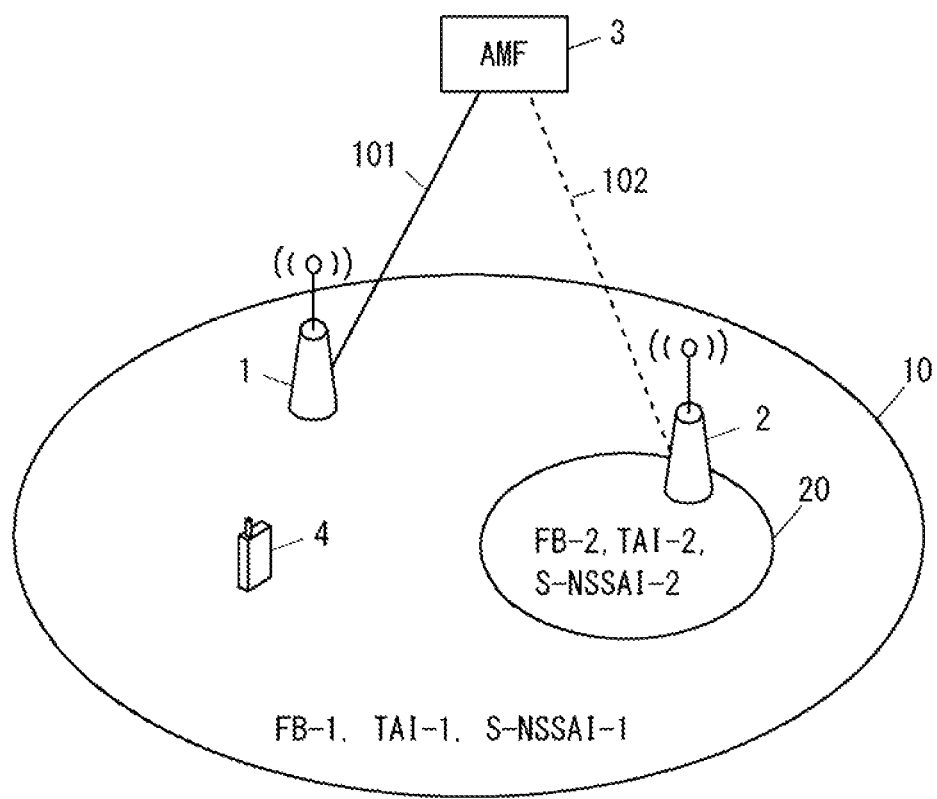
FIG. 1A is a diagram showing a configuration example of a radio communication network according to an aspect.
Figure 1B:
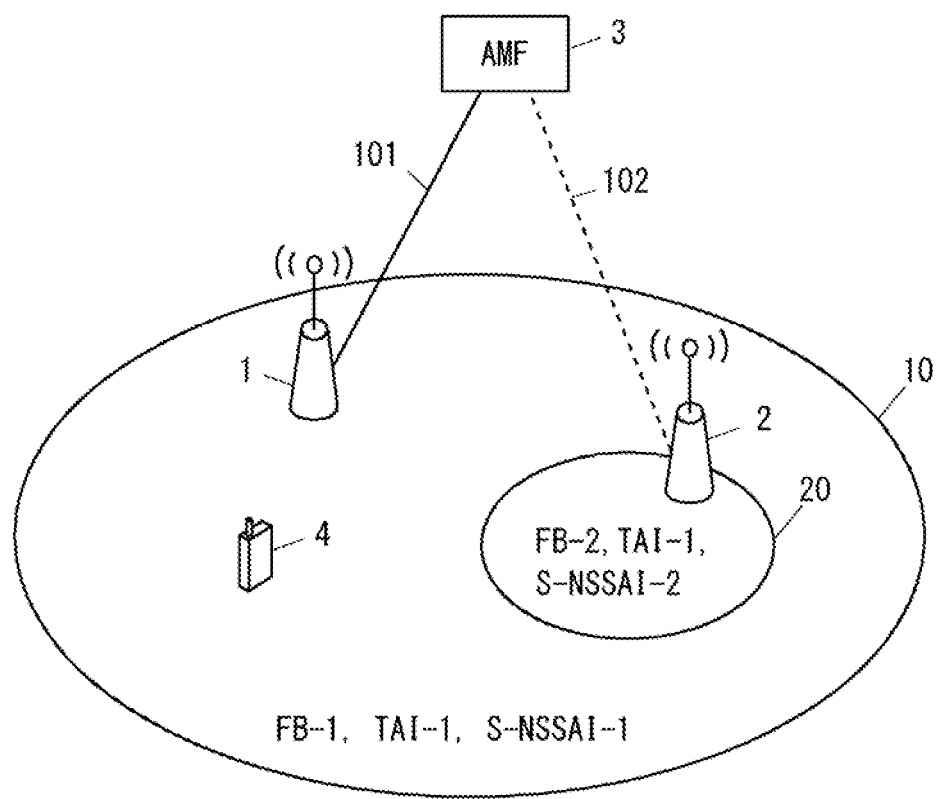
FIG. 1B is a diagram showing a configuration example of a radio communication network according to an aspect.

FIG. 1A and 1B show a configuration example of a radio communication network (i.e., 5GS) according to aspects including this aspect. In the examples of FIGS. 1A and 1B, the radio communication network includes (Radio) Access Network ((R)AN) nodes 1 and 2, an AMF 3, and a UE 4. Each element (or network function) shown in FIGS. 1A and 1B may be implemented, for example, as a network element on dedicated hardware, as a software instance running on dedicated hardware, or as a virtualization function instantiated on an application platform.

The (R)AN nodes 1 and 2 are arranged in (R)AN (i.e., NG-RAN). The (R)AN nodes 1 and 2 may be gNBs. The (R)AN nodes 1 and 2 may be Central Units (e.g., gNB-CUs) in cloud RAN (C-RAN) deployment. The first (R)AN node 1 terminates an interface 101 (i.e., N2 (or NG-C) interface) and interworks with the AMF 3 on the interface 101. In some implementations, the second (R)AN node 2 may terminate a CP interface 102 (i.e., N2 (or NG-C) interface) and interwork with the AMF 3 on the interface 102. In other implementations, the second (R)AN node 2 does not have to have a CP interface (i.e., N2 (or NG-C) interface) with any AMF. For example, if the second (R)AN node 2 is responsible for only an SN in DC, the second (R)AN node 2 does not have to have the CP interface 102 with the AMF 3.

The (R)AN node 1 provides at least one cell (hereinafter referred to as cell 10) having a cell coverage area 10 as a service area. The (R)AN node 2 provides at least one cell (hereinafter referred to as cell 20) having a cell coverage area 20 as a service area. The cell 10 operates in a difference frequency band than that of the cell 20 and supports a different network slice than that supported by the cell 20.

More specifically, in the examples of FIGS. 1A and 1B, the cell 10 operates in a first frequency band (FB-1) and supports a first network slice identifier (S-NSSAI-1). In contrast, the cell 20 operates in a second frequency band (FB-2) and supports a second network slice identifier (S-NSSAI-2).

In some implementations, the frequency band FB-2 of the cell 20 may be higher than the frequency band FB-1 of the cell 10. For example, the frequency band FB-2 of the cell 20 may be a millimeter wave band (e.g., 28 GHz), while the frequency band FB-1 of the cell 10 may be sub-6 GHz. In this case, as shown in FIGS. 1A and 1B, the cell 20 of the higher frequency band may be a local cell (or small cell) sparsely (or patchily) arranged within the cell 10 of the lower frequency band. The cell 10 may completely cover the cell 20 or may partially overlap with the cell 20. The cell 20 may be a cell of a Stand-alone Non-Public Network (SNPN) defined in Non-Patent Literature 1, or may be a cell of a Public Network integrated Non-Public Network (NPN).

The AMF 3 is one of the network functions in the 5GC control plane. The AMF 3 provides the termination of CP interface 101 (and the CP interface 102). The AMF 3 terminates a single signaling connection (i.e., Ni Non-Access Stratum (NAS) signalling connection) with the UE 4, and provides registration management, connection management, and mobility management. In addition, the AMF 3 provides NF services on a service-based interface (i.e., Namf interface) to NF consumers (e.g., other AMFs, Session Management Function (SMF), and Authentication Server Function (AUSF)). Furthermore, the AMF 3 uses NF services provided by other NFs (e.g., UDM, Network Slice Selection Function (NSSF), and Policy Control Function (PCF)).

The AMF 3 can know the network slices (S-NSSAIs) supported by the (R)AN node 1 through a procedure for setting up the CP interface 101. Specifically, the (R)AN node 1 provides the AMF 3 with a Supported TA List IE and a TAI Slice Support List IE during the procedure for setting up application-level configuration data required for interworking with the AMF on the CP interface 101. The Supported TA List IE indicates the TAs supported in the (R)AN node 1. The TAI Slice Support List IE is contained in the Supported TA List IE and indicates supported S-NSSAIs per TA (or Tracking Area Identity (TAI)).

Similarly, the AMF 3 may receive a list of TAs (or TAIs) supported by the (R)AN node 2 and a list supported S-NSSAIs per TA (or TAI), from the (R)AN node 2. Alternatively, if the CP interface 102 is not set up, the AMF 3 may be notified by the (R)AN node 1 of these lists regarding the (R)AN node 2. Alternatively, the AMF 3 may be configured with these lists regarding the (R)AN node 2 by an operator.

The UE 4 can communicate with the first (R)AN node 1 via an air interface in one or more cells (including the cell 10) provided by the first (R)AN node 1. Further, if one or more cells (including the cell 20) provided by the second (R)AN node 2 are available, the UE 4 can communicate with the second (R)AN node 2 via an air interface. In some implementations, the UE 4 may communicate simultaneously with the first and second (R)AN nodes 1 and 2 and perform dual connectivity (DC) between a master cell group (MCG) and a secondary cell group (SCG). The MCG is a group of serving cells associated with (or provided by) the first (R)AN node 1 acting as the MN in DC, and includes the SpCell (i.e., Primary Cell (PCell)) and optionally one or more Secondary Cells (SCells). Meanwhile, the SCG is a group of serving cells associated with (or provided by) the second (R)AN node 2 acting as an SN in DC, and includes the primary cell of the SCG and optionally one or more Secondary Cells (SCells). The primary cell of the SCG is referred to as Primary SCG cell (PSCell) or Primary Secondary Cell (PSCell). The PSCell is the Special Cell (SpCell) of the SCG.

In the examples of FIGS. 1A and 1B, the cell 10 belongs to a first tracking area (TA) identified by a first TAI (TAI-1). The tracking area (TA) to which the cell 20 belongs is different in FIG. 1A and FIG. 1B. More specifically, in the example of FIG. 1A, the cell 20 belongs to a second TA different from the first TA to which the cell 10 belongs. The second TA is identified by a second TAI (TAI-2). On the other hand, in the example of FIG. 1B, the cell 20 belongs to the first TA, the same as the cell 10.

Figure 2A:
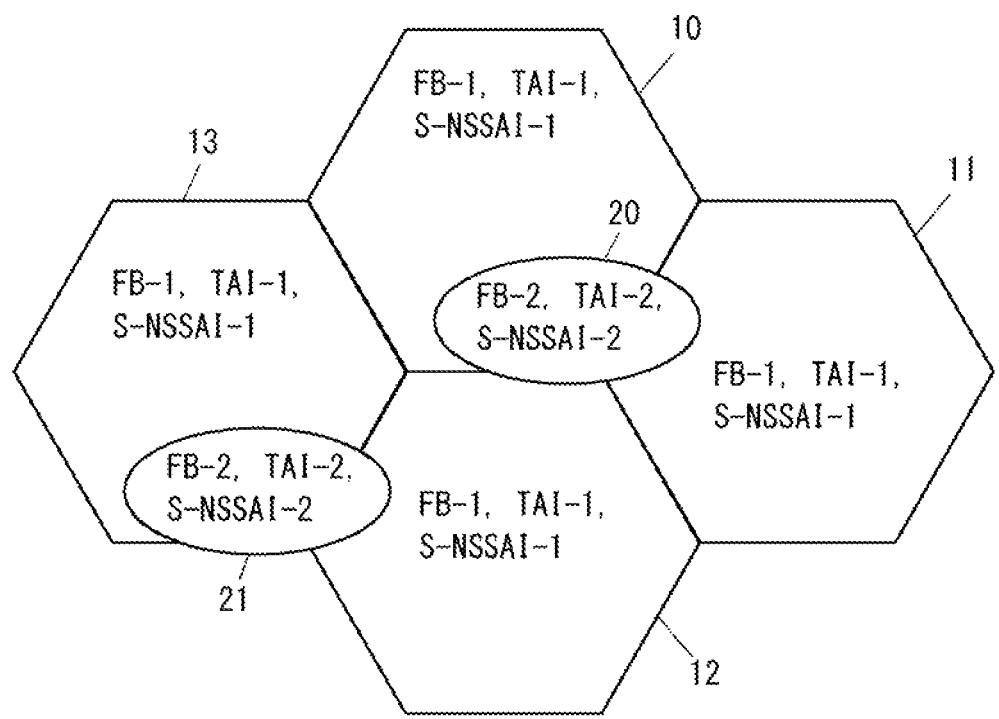
FIG. 2A is a diagram showing a configuration example of a radio communication network according to an aspect.

According to the configuration example of FIG. 1A, the first TA and the second TA may be defined and arranged as shown in FIG. 2A. In the example of FIG. 2A, the first TA identified by the first TAI-1 may consist of the cell 10 and its neighbor cells (e.g., cell 10-13), each of which operates in the first frequency band FB-1 and supports the first network slice identifier S-NSSAI-1. In other words, the first TA (TAI-1) may be composed of a group of cells adjacent to each other, each supporting the first network slice identifier S-NSSAI-1. In contrast, the second TAs identified by the second TAI-2 may consist of the cell 20 and the cell 21 that are sparsely placed, each of which operates in the second frequency band FB-2 and supports the second network slice identifier S-NSSAI-2. In other words, the second TA (TAI-2) may be composed of a group of cells separated from each other, each supporting the second network slice identifier S-NSSAI-2.

Figure 2B:
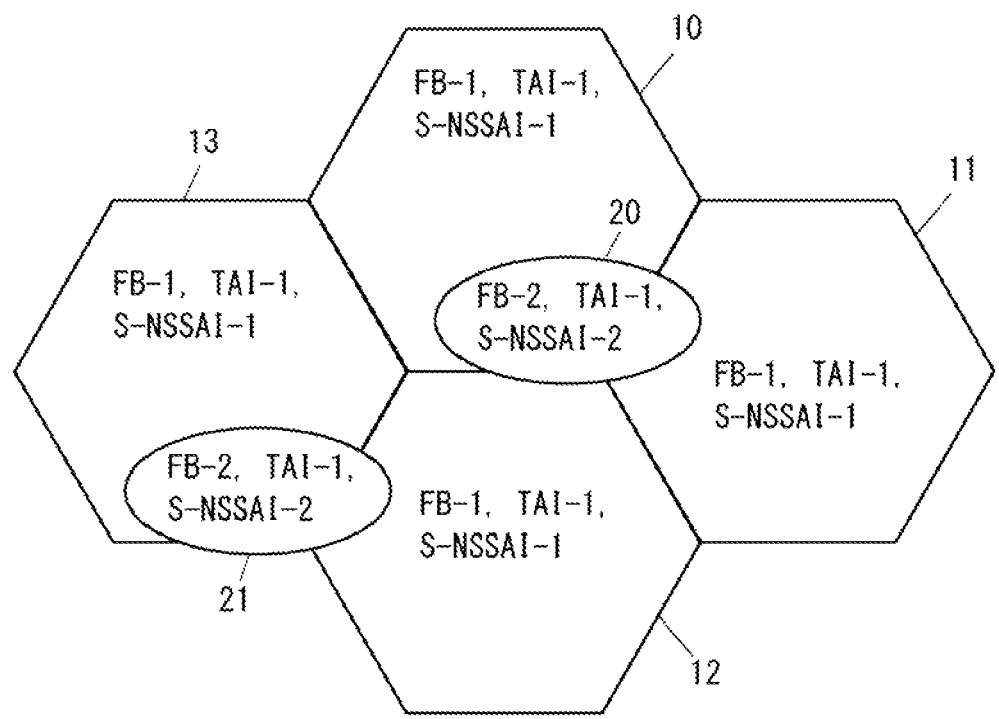
FIG. 2B is a diagram showing a configuration example of a radio communication network according to an aspect.

According to the configuration example of FIG. 1B, the first TA may be defined and arranged as shown in FIG. 2B. In the example of FIG. 2B, the first TA identified by the first TAI-1 includes the cells 10-13 that operate in the first frequency band FB-1 and support the first network slice identifier S-NSSAI-1, and further includes the cells 20 and 21 that operate in the second frequency band FB-2 and support the second network slice identifier S-NSSAI-2. Put another way, in the example of FIG. 2B, the first TA identified by the first TAI-1 includes cells operates in different frequency bands and supports different network slices (e.g., the cell 10 and the cell 20).

The configurations shown in FIGS. 1A and 1B may be modified as follows, for example. In the examples of FIGS. 1A and 1B, the cells 10 and 20 are provided by different (R)AN nodes 1 and 2. Alternatively, the cells 10 and 20 may be provided by the same (R)AN node (e.g., (R)AN node 1). In this case, the UE 4 may perform carrier aggregation of the cells 10 and 20 to communicate simultaneously in the cells 10 and 20.

In the following, a registration procedure according to this aspect is described. The registration procedure of the 5GS is used, for example, for initial registration and mobility registration. The initial registration is used by the UE 4 to connect to the network (i.e., 5GC) after power-on. The mobility registration is used by the UE 4 when the UE 4 moves out of the registration area or when the UE 4 needs to update its capabilities or other parameters that have been negotiated in the registration procedure.

The AMF 3 sends a registration accept message to the UE 4 via the first (R)AN node 1 in response to receiving a registration request message from the UE 4 via the first (R)AN node 1. The registration accept message indicates the registration area of the UE 4. The registration area of the UE 4 is a list (i.e., TAI list) of one or more TAs (TAIs). In addition, the registration accept message includes a list of one or more conditionally allowed network slice identifiers (i.e., S-NSSAIs). Each conditionally allowed S-NSSAI is not available in every part of the registration area of the UE 4, but is available in at least one particular cell or at least one particular tracking area contained in the registration area of the UE 4. Such a list of at least one conditionally allowed S-NSSAIs may be referred to as Conditionally Allowed NSSAI or Conditional NSSAI.

The registration accept message may further include a list similar to the existing Allowed NSSAI. Specifically, the registration accept message may further include a list of allowed S-NSSAIs available throughout the registration area of the UE 4.

Figure 3A:
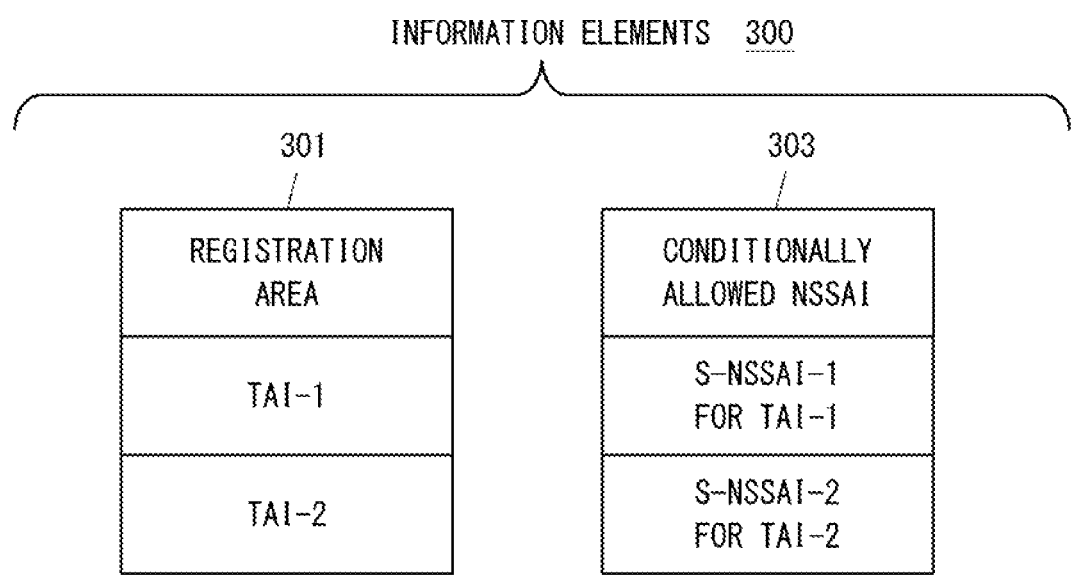
FIG. 3A is a diagram showing an example of information elements included in a registration accept message according to an aspect.

According to the examples of FIGS. 1A and 2A, the AMF 3 may send information elements 300 shown in FIG. 3A to the UE 4 via the registration accept message. Specifically, the AMF 3 may incorporate both TAI-1 and TAI-2 into the registration area 301 of the UE 4, and include both S-NSSAI-1 and S-NSSAI-2 in the Conditionally Allowed NSSAI 303 of the UE 4. In this case, the registration accept message may indicate at least one particular TA with which each conditionally allowed S-NSSAI is associated. As shown in FIG. 3A, S-NSSAI-1 in the Conditionally Allowed NSSAI 303 may be associated with TAI-1. This indicates that S-NSSAI-1 is not available in every part of the registration area of the UE 4 (i.e., both TAI-1 and TAI-2), but is conditionally available (or allowed) only in TAI-1. In an analogous manner, S-NSSAI-2 in the Conditionally Allowed NSSAI 303 may be associated with TAI-2. This indicate that S-NSSAI-2 is not available in every part of the registration area of the UE 4 (i.e., both TAI-1 and TAI-2), but is conditionally available (or allowed) only in TAI-2.

According to the examples of FIGS. 1A, 2A, and 3A, when the AMF 3 sends a TAI list indicating that both TAI-1 and TAI-2 is included in the registration area to the UE4 via a registration accept message, an S-NSSAI included in the Conditionally Allowed NSSAI regarding the registration area of the UE 4 can be used only in a part of the TAs that make up the registration area.

Figure 3B:
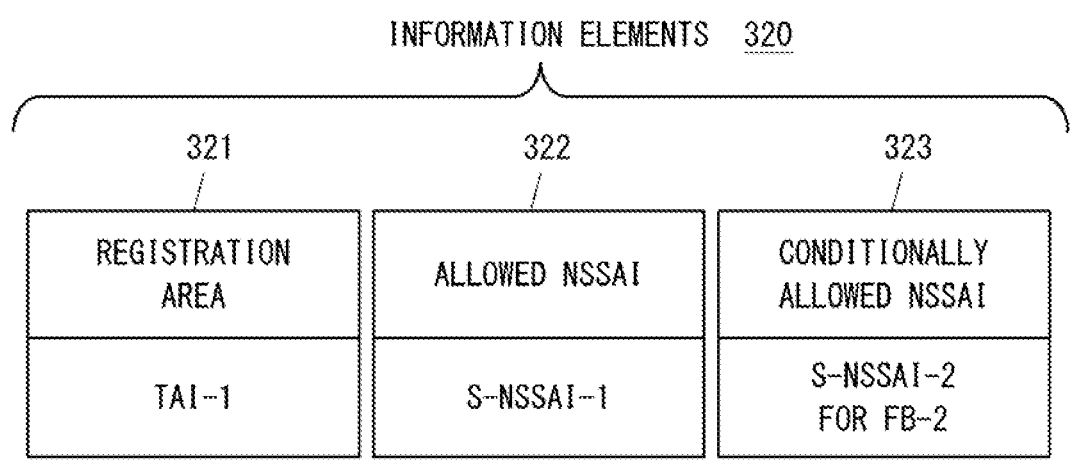
FIG. 3B is a diagram showing an example of information elements included in a registration accept message according to an aspect.

On the other hand, according to the examples of FIGS. 1B and 2B, the AMF 3 may send information elements 320 shown in FIG. 3B to the UE 4 via the registration accept message. Specifically, the AMF 3 may incorporate only TAI-1 into the TAI list indicating the registration area 321 of the UE 4, incorporate S-NSSAI-1 into the Allowed NSSAI 322 of the UE 4, and incorporate S-NSSAI-2 into the Conditionally Allowed NSSAI 323 of the UE 4. In this case, the registration accept message may indicate at least one particular cell with which each conditionally allowed S-NSSAI is associated, or indicate at least one frequency band in which at least one specific cell associated with each conditionally allowed S-NSSAI operates. As shown in FIG. 3B, S-NSSAI-2 in the Conditionally Allowed NSSAI 323 may be associated with the second frequency band FB-2. This indicates that S-NSSAI-2 is not available in every part of the registration area (i.e., TAI-1) of the UE 4, but is conditionally available (or allowed) only in at least one particular cell operating in the particular frequency band FB-2.

According to the examples of FIGS. 1B, 2B, and 3B, an S-NSSAI included in the Conditionally Allowed NSSAI regarding the registration area of the UE 4 can be used in all the TA(s) constituting the registration area. However, an S-NSSAI included in the Conditionally Allowed NSSAI is provided only in a part of the cells (or geographical areas) within the TA(s) included in the registration area. In other words, an S-NSSAI included in the Conditionally Allowed NSSAI is provided only in cells operating in a particular frequency band within the TA(s) included in the registration area.

As can be understood from the above description, in this aspect, the AMF 3 sends a list of one or more conditionally allowed S-NSSAIs to the UE 4 via a registration accept message. Each conditionally allowed S-NSSAI is not available in every part of a registration area of the UE 4, but is available in at least one particular cell or at least one particular tracking area contained within the registration area. This allows the UE 4 to easily utilize a network slice that is only supported by sparsely (or patchily) placed local cells. In some implementations, in response to detecting a cell, frequency band, or TA that supports a conditionally allowed S-NSSAI (e.g., S-NSSAI-2), the UE 4 is allowed to request the core network (e.g., AMF3) to establish or activate a protocol data unit (PDU) session associated with the conditionally allowed S-NSSAI, without executing an additional registration request procedure. In some implementations, even if the second (R)AN node 2 is a candidate SN that is responsible for only an SN in DC and has no CP connection with any AMF, the UE 4 can utilize a service through the network slice (S-NSSAI-2) supported by the second (R)AN node 2.

FIG. 4 shows an example of the registration procedure of the UE 4. In step 401, the UE 4 transmits a Radio Resource Control (RRC) Setup Complete message to the first (R)AN node 1. The RRC Setup Complete message includes a NAS message (registration request message) and a Requested NSSAI. The UE 4 also incorporates the Requested NSSAI into the registration request message. The Requested NSSAI includes S-NSSAI-1 supported by the first (R)AN node 1 and S-NSSAI-2 supported by the second (R)AN node 2.

The first (R)AN node 1 selects the AMF 3 based on the Requested NSSAI. In step 402, the first (R)AN node 1 sends the NAS message (registration request message) to the selected AMF 3 via an N2 (or NG-C) signaling message. The N2 message may be an INITIAL UE MESSAGE message. The NAS message (registration request message) contains the Requested NSSAI including S-NSSAI-1 and S-NS SAI-2.

The AMF 3 may determine whether to allow S-NSSAI-1 and S-NSSAI-2 included in the Requested NSSAI to the UE 4 based on the one or more Subscribed S-NSSAIs of the UE 4. Specifically, the AMF 3 may get the Subscribed S-NSSAI(s) of the UE 4 from an UDM, and then check if the Subscribed S-NSSAI(s) of the UE 4 includes S-NSSAI-1 and S-NSSAI-2 or their corresponding S-NSSAIs (HPLMN S-NSSAIs). In the example of FIG. 4, the AMF 3 incorporates S-NSSAI-1 into the Allowed NSSAI, while it incorporates S-NSSAI-2 into the Conditional NSSAI (or Conditionally Allowed NSSAI). This example may be made based on a determination in the UDM on whether or not S-NSSAI-1 and S-NSSAI-2 are included in the Subscribed S-NSSAI(s) of the UE 4. Further, the AMF 3 determines a registration area (i.e., TAI list) of the UE 4 based on the determined Allowed NSSAI and Conditional NSSAI. Specifically, the AMF 3 determines the TAs constituting the registration area of the UE 4 in a manner such that that every S-NSSAI included in the Allowed NSSAI is available in all the TAs in the registration area, and that every S-NSSAI included in the Conditional NSSAI is available in at least one cell or TA in the registration area.

In step 403, the AMF 3 sends a NAS approval response (Registration Accept) message to the UE 4 via the first (R)AN node 1. The approval response message indicates the registration area (i.e., TAI list), the Allowed NSSAI, and the Conditional NSSAI. The approval response message may include other information elements, such as Rejected NSSAI or Pending NSSAI or both. If there is no allowed S-NSSAI for the UE 4, the approval response message does not have to include the Allowed NSSAI. If an S-NSSAI(s) configured in the Conditional NSSAI is also configured in the Pending NSSAI, after sending the NAS Authorization Accept message in step 403 via the first (R)AN node 1 to the UE 4, the AMF 3 may perform a Network Slice-Specific Authentication and Authorization (NSSAA) procedure specified in Non-Patent Literature 1 for the S-NSSAI(s) configured in the Conditional NSSAI.

Figure 5:
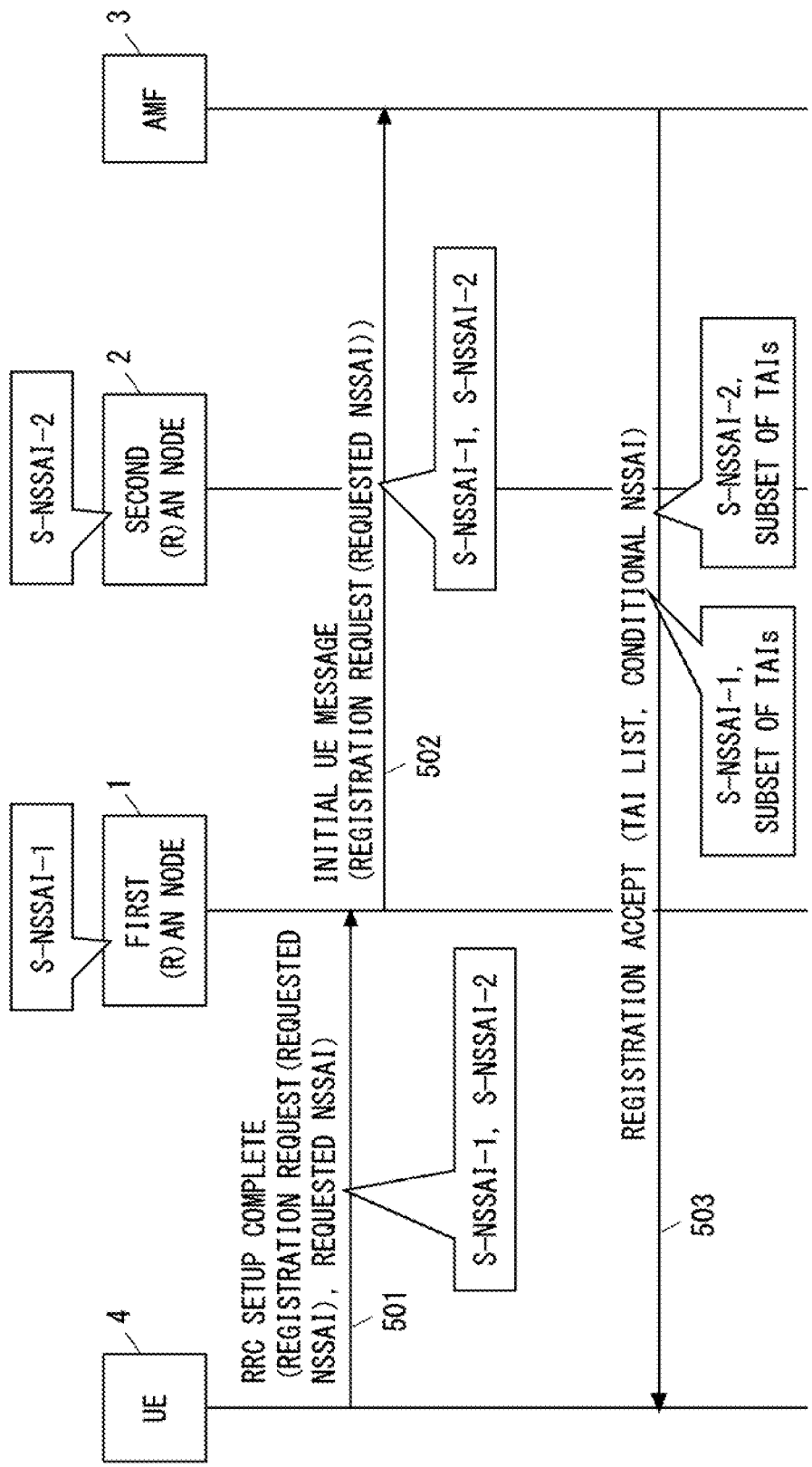
FIG. 5 is a sequence diagram showing an example of signaling according to an aspect.

FIG. 5 shows another example of the registration procedure of the UE 4. Steps 501 and 502 are similar to steps 401 and 402 in FIG. 4. FIG. 5 relates to the case described with reference to FIG. 3A. Accordingly, in step 503, the AMF 3 includes both S-NSSAI-1 and S-NSSAI-2 into the Conditional NSSAI. S-NSSAI-1 within the Conditional NSSAI may be associated with a subset of TAIs contained in the registration area of the UE 4. Similarly, S-NSSAI-2 within the Conditional NSSAI may be associated with a subset of TAIs contained in the registration area of the UE 4. According to the example of FIG. 3A, the TAI subset associated with S-NSSAI-1 contains TAI-1, while the TAI subset associated with S-NSSAI-2 contains TAI-2.

Figure 6:
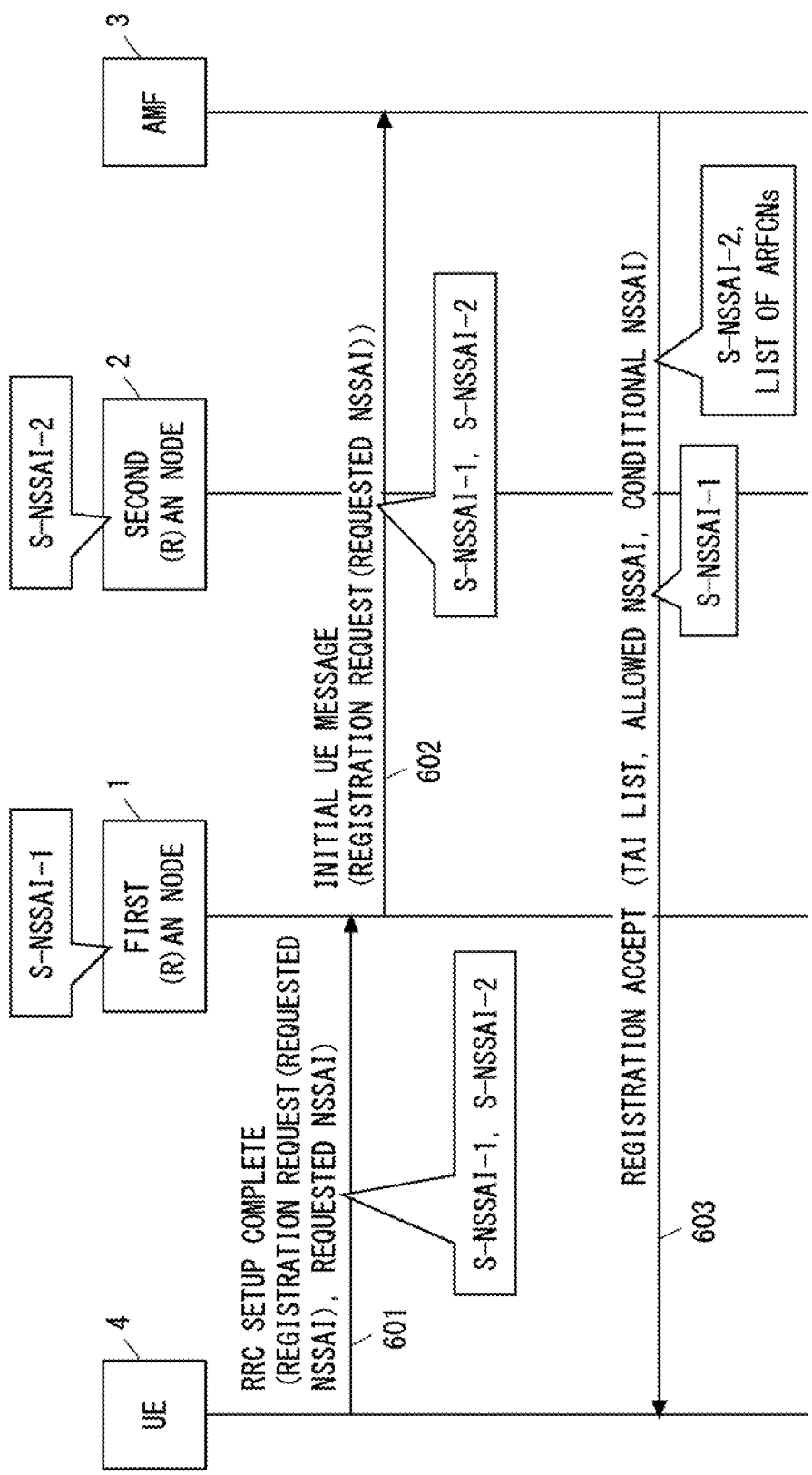
FIG. 6 is a sequence diagram showing an example of signaling according to an aspect.

FIG. 6 shows yet another example of the registration procedure of the UE 4. Steps 601 and 602 are similar to steps 401 and 402 in FIG. 4. FIG. 6 relates to the case described with reference to FIG. 3B. Accordingly, the AMF 3 includes S-NSSAI-1 into the Allowed NSSAI and incorporates S-NSSAI-2 into the Conditional NSSAI. S-NSSAI-2 within the Conditional NSSAI may be associated with a list of one or more frequency bands in which one or more particular cells in which S-NSSAI-2 is available operate. The list may be a list of NR Absolute Radio Frequency Channel Numbers (NR-ARFCNs).

Second Aspect

Configuration examples of a radio communication network according to this aspect are the same as the examples described with reference to FIGS. 1A, 1B, 2A, and 2B. This aspect provides a specific example of the operation of the AMF 3 and the UE 4.

Figure 7:
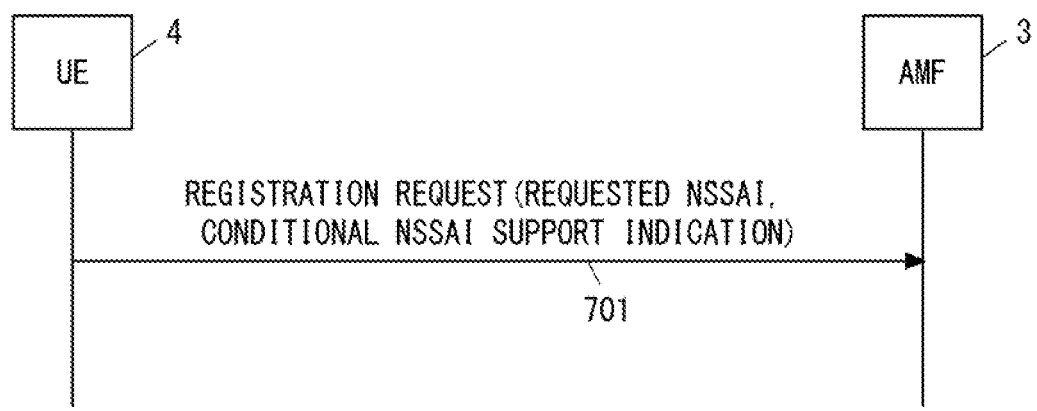
FIG. 7 is a sequence diagram showing an example of signaling according to an aspect.

FIG. 7 shows an example of signaling according to the aspect. The UE 4 incorporates in a registration request message a specific indication that the UE 4 supports conditional allowance of a network slice identifier (S-NSSAI). The name of the specific indication may be, for example, Conditional NSSAI Support Indication or Conditional NSSAI Support Indicator. In step 701, the UE 4 sends the registration request message containing the specific indication to the AMF 3. In response to detecting the specific indication from the registration request message, the AMF 3 may incorporate at least one S-NSSAI contained into the Requested NSSAI of the UE 4 in a Conditional NSSAI, and send a registration accept message containing the Conditional NSSAI to the UE 4. In contrast, if the registration request message received from the UE 4 does not include the specific indication described above, the AMF 3 configures no Conditional NSSAI to the UE 4. Whilst the(R)AN node receives the registration request message shown in step 701 from the UE 4 and sends (or forwards) it to the AMF 3, the UE 4 may send the above-mentioned specific indication to the (R)AN node via an RRC message. This RRC message may be an RRC Setup Request message or an RRC Setup Complete message.

The signaling shown in FIG. 7 allows the AMF 3 to know whether the UE 4 supports Conditional NSSAI. Therefore, the AMF 3 can operate to configure a Conditional NSSAI to the UE 4 only if the UE 4 supports Conditional NSSAI.

Third Aspect

Configuration examples of a radio communication network according to this aspect are the same as the examples described with reference to FIGS. 1A, 1B, 2A, and 2B. This aspect provides a modification of the registration procedure described with reference to FIG. 6.

Figure 8:
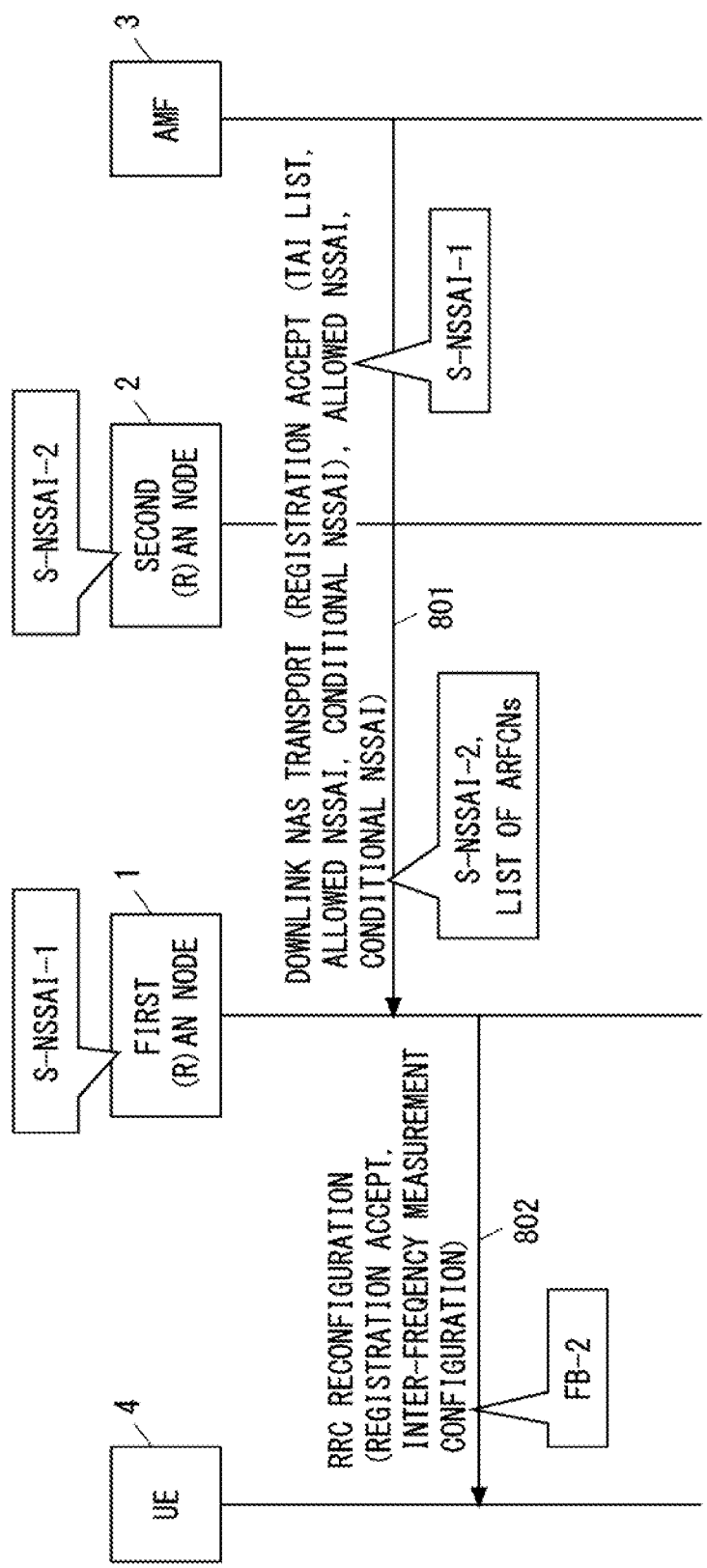
FIG. 8 is a sequence diagram showing an example of signaling according to an aspect.

The FIG. 8 relates to the transmission of the registration accept message in step 603 of FIG. 6. In step 801 the AMF 3 sends an N2 message including a NAS message (registration accept message) to the first (R)AN node 1. The N2 message may be a DOWNLINK NAS TRANSPORT message. As described with reference to FIG. 6, the NAS message (registration accept message) includes a Conditional NSSAI. The Conditional NSSAI includes S-NSSAI-2 and is associated with a list of one or more frequency bands in which at least one particular cell in which S-NSSAI-2 is available operates. The list includes the second frequency band FB-2 in which the cell 20 supporting S-NSSAI-2 operates. The list may be a list of ARFCNs. The AMF 3 also incorporates a Conditional NSSAI in the N2 message that carries the NAS message (registration accept messages). This allows the first (R)AN node 1 to know the Conditional NSSAI of the UE 4.

Based on the Conditional NSSAI of the UE 4, the first (R)AN node 1 creates an inter-frequency measurement configuration to enable the UE 4 to measure the frequency band(s) associated with the S-NSSAI(s) included in the Conditional NSSAI. More specifically, while considering the radio capability of the UE 4 (e.g., the number of the Radio Frequency (RF) chains of the UE 4), the first (R)AN node 1 creates a configuration (e.g., measurement gap) required to measure the second frequency band FB-2 in which a cell supporting S-NSSAI-2 included in the Conditional NSSAI operates. In step 802, the first (R)AN node 1 transmits an RRC message including the NAS message (registration accept message) received from the AMF 3 and the inter-frequency measurement configuration to the UE 4. The RRC message may be an RRC Reconfiguration message. As a result, when the UE 4 is in RRC_CONNECTED in the cell 10 of the first (R)AN node 1, the UE 4 can perform a search for discovering a cell of the second frequency band FB-2 that supports S-NSSAI-2 included in the Conditional NSSAI.

Fourth Aspect

Configuration examples of a radio communication network according to this aspect are the same as the examples described with reference to FIGS. 1A, 1B, 2A, and 2B. This aspect provides a specific example of an operation of the UE 4 after a registration procedure is completed.

Figure 9:
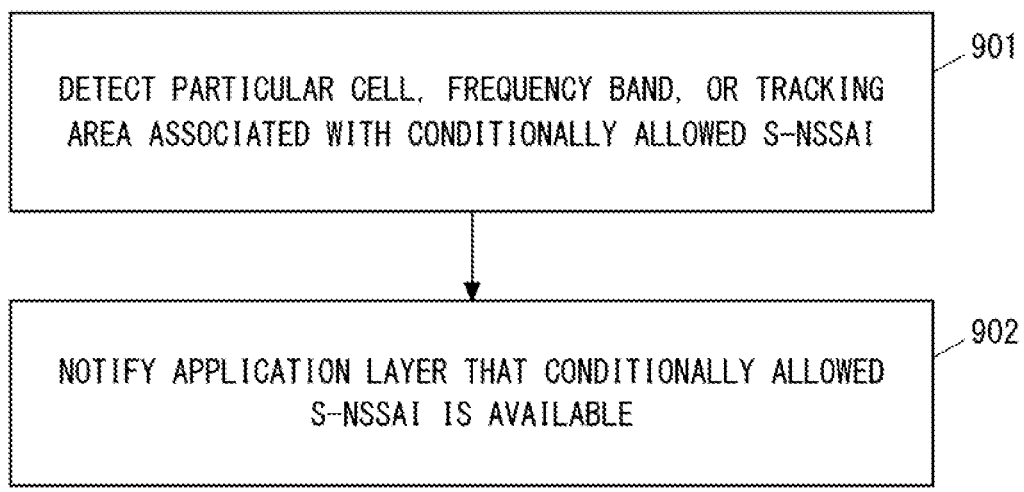
FIG. 9 is a flowchart showing an example of operation of a UE according to an aspect.

FIG. 9 shows an example of the operation of the UE 4. The operation shown in FIG. 9 is performed by a NAS layer of the UE 4, or by RRC and NAS layers of the UE 4. In step 901, the UE 4 detects a particular cell, frequency band, or tracking area associated with a conditionally allowed S-NSSAI (e.g., S-NSSAI-2). In other words, the UE 4 detects a particular cell, frequency band, or tracking area in which the conditionally allowed S-NSSAI is available.

In step 902, in response to the detection in step 901, the UE 4 (i.e., NAS layer or RRC layer) notifies an application layer that the conditionally allowed S-NSSAI is available. The application layer may be a UE application that uses a communication service (e.g., URLLC) provided via conditionally allowed S-NSSAI. This allows the application layer to know that conditionally allowed S-NSSAI is available. For example, if a PDU session (e.g., URLLC session) associated with the conditionally allowed S-NSSAI is required or pending, the application layer may request the UE4 (i.e., NAS layer or RRC layer) to establish or activate the PDU session in response to the notification in step 902. The application layer may determine whether to request the establishment or activation of the PDU session based on information on whether the UE 4 is stationary or not, which can be obtained based on an accelerometer or the like included in the UE 4. For example, the application layer may determine to request the establishment or activation of the PDU session based on the information that the UE 4 is stationary. When the conditionally allowed S-NSSAI is provided in a higher frequency band, it is possible to provide more stable communication to the UE 4 by using the information on whether or not the UE 4 is stationary.

If the UE 4 no longer detect the particular cell, frequency band, or tracking area associated with the conditionally allowed S-NSSAI, the UE 4 may inform the application layer that the conditionally allowed S-NSSAI is not available.

According to the operation of FIG. 9, the UE 4 can inform the application layer, for example, the availability of a network slice supported only by sparsely (or patchily) arranged local cells.

Fifth Aspect

Configuration examples of a radio communication network according to this aspect are the same as the examples described with reference to FIGS. 1A, 1B, 2A, and 2B. This aspect provides a specific example of an operation of the UE 4 after a registration procedure is completed.

Figure 10:
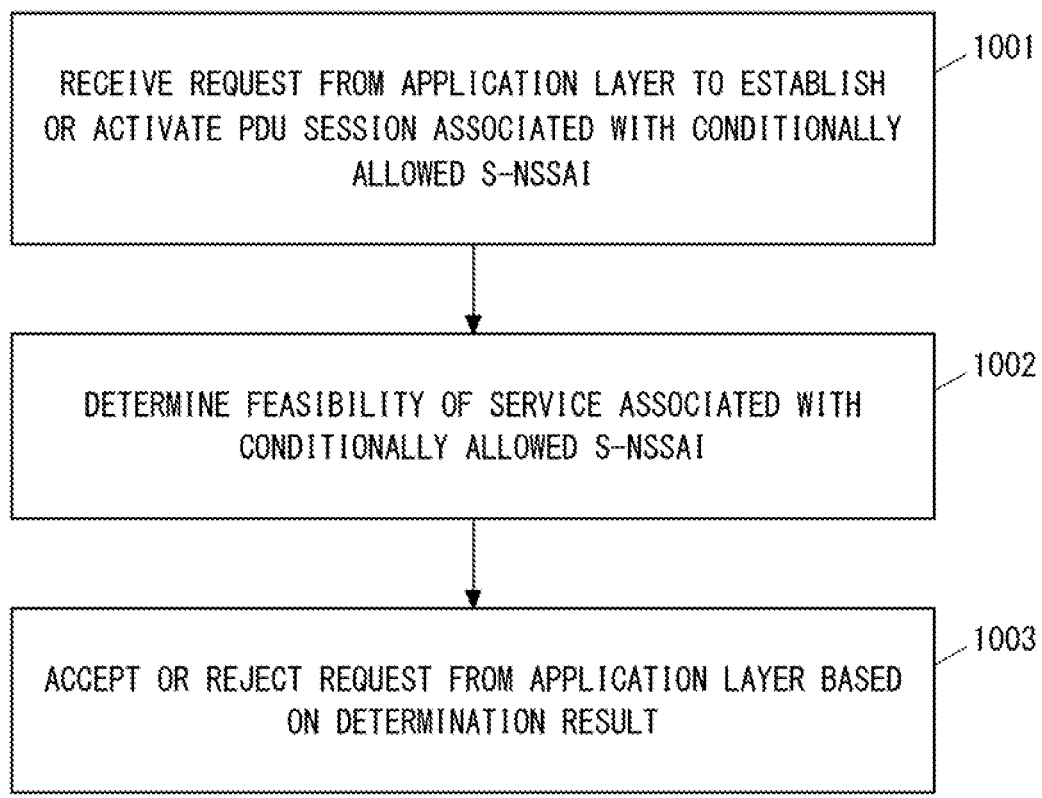
FIG. 10 is a flowchart showing an example of operation of a UE according to an aspect.

The UE 4 according to this aspect request the core network (5GS, AMF) to establish or activate a PDU session associated with a conditionally allowed S-NSSAI only if the UE 4 detects any of at least one particular cell (or particular tracking area). FIG. 10 shows an example of the operation of the UE 4. The operation shown in FIG. 10 is performed by a NAS layer of the UE 4, or by RRC and NAS layers of the UE 4.

In step 1001, the UE 4 receives a request from an application layer to establish or activate a PDU session associated with a conditionally allowed S-NSSAI (e.g., S-NSSAI-2).

In step 1002, the UE 4 determines the feasibility of the service associated with the conditionally allowed S-NSSAI. Specifically, the UE 4 may see if the UE 4 has detected a particular cell, frequency band, or tracking area associated with the conditionally allowed S-NSSAI.

Additionally, or alternatively, if the UE 4 is in RRC_IDLE or RRC_INACTIVE and if there is no dormant (or suspended, deactivated) PDU session associated with any allowed S-NSSAI (e.g., S-NSSAI-1), the UE 4 may decide to perform cell reselection to another cell in which the conditionally allowed S-NSSAI (e.g., S-NSSAI-2) is provided.

Additionally, or alternatively, if the UE 4 is in RRC_IDLE or RRC_INACTIVE, if there is a dormant (or suspended, deactivated) PDU session associated with an allowed S-NSSAI (e.g., S-NSSAI-1), and if both the allowed S-NSSAI (e.g., S-NSSAI-1) and the conditionally allowed S-NSSAI (e.g., S-NSSAI-2) are available in another cell, the UE 4 may transition to RRC_CONNECTED in the current cell and decide to request, via the current cell, a handover to the cell where the conditionally allowed S-NSSAI is available.

Additionally, or alternatively, if the UE 4 is in RRC_CONNECTED in a cell associated with an allowed S-NSSAI (e.g., S-NSSAI-1), if there is an active PDU session associated with this allowed S-NSSAI, and if both the allowed S-NSSAI (e.g., S-NSSAI-1) and the conditionally allowed S-NSSAI (e.g., S-NSSAI-2) are available in another cell, the UE 4 may decide to request a handover to the other cell where the conditionally allowed S-NSSAI is available.

Additionally, or alternatively, if the UE 4 in RRC_IDLE or RRC_INACTIVE, if there is a dormant (or suspended, deactivated) PDU session associated with an allowed S-NSSAI (e.g., S-NSSAI-1), and if this allowed S-NSSAI (e.g., S-NSSAI-1) is unavailable in a cell where the conditionally allowed S-NSSAI (e.g., S-NSSAI-2) is available, the UE 4 may determine whether to move to the cell of the conditionally allowed S-NSSAI or stay in the current cell based on an internal logic of the UE 4. The UE 4 may refer to a UE Route Selection Policy (URSP) to determine priority between the allowed S-NSSAI (e.g., S-NSSAI-1) and the conditionally allowed S-NSSAI (e.g., S-NSSAI-2).

Additionally, or alternatively, if the UE 4 is in RRC_CONNECTED in a cell associated with an allowed S-NSSAI (e.g., S-NSSAI-1), if there is an active PDU session associated with this allowed S-NSSAI, and if the allowed S-NSSAI (e.g., S-NSSAI-1) is unavailable in a cell where the conditionally allowed S-NSSAI (e.g., S-NSSAI-2) is available, the UE 4 may determine whether to move to the cell of the conditionally allowed S-NSSAI or stay in the current cell based on an internal logic of the UE 4. The UE 4 may refer to a URSP to determine priority between the allowed S-NSSAI (e.g., S-NSSAI-1) and the conditionally allowed S-NSSAI (e.g., S-NSSAI-2).

Additionally, or alternatively, if the UE 4 is in RRC_CONNECTED in a cell associated with an allowed S-NSSAI (e.g., S-NSSAI-1), and if dual connectivity or carrier aggregation is possible between the current cell and a cell where the conditionally allowed S-NSSAI (e.g., S-NSSAI-2) is available, the UE 4 may determine to request dual connectivity or carrier aggregation.

In step 1003, the UE 4 accepts or rejects the request from the application layer based on the determination result in step 1002. For example, if the UE 4 decides to stay in the current cell associated with allowed S-NSSAI (e.g., S-NSSAI-1), the UE 4 rejects the request from the application layer. When rejecting the request from the application layer, the UE 4 may notify the application layer of a reject cause (e.g., higher priority PDU sessions active) and a backoff timer value.

The operation of FIG. 10 can allow the UE 4, for example, to appropriately provide the application layer with a communication service via a network slice that is supported only by sparsely (or patchily) arranged local cells.

Sixth Embodiment

Configuration examples of a radio communication network according to this aspect are the same as the examples described with reference to FIGS. 1A, 1B, 2A, and 2B. This aspect provides a specific example of an operation of the UE 4 after a registration procedure is completed.

Figure 11:
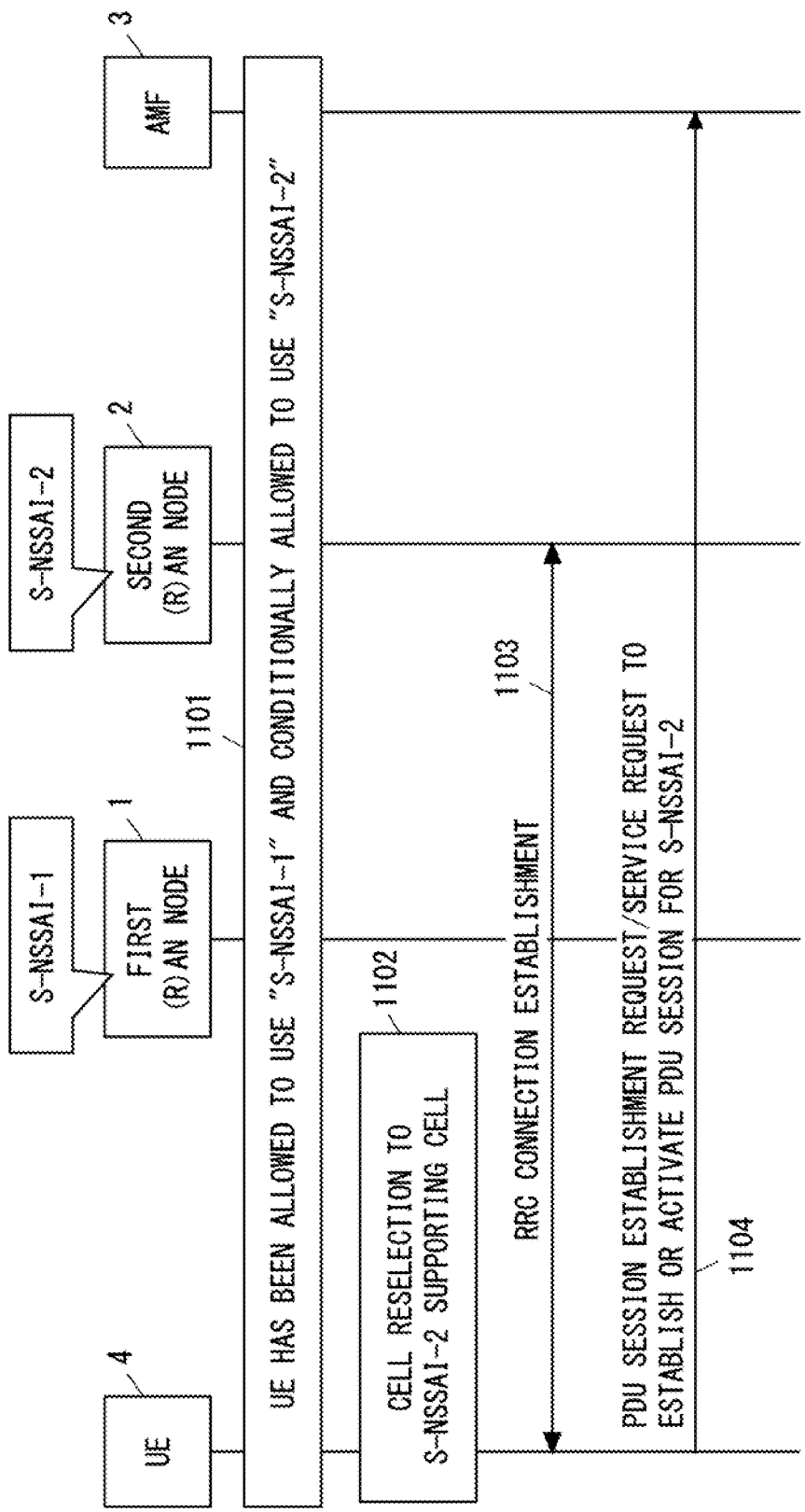
FIG. 11 is a sequence diagram showing an example of signaling according to an aspect.

FIG. 11 shows an example of cell reselection. In step 1101, the UE 4 has completed a registration procedure via the cell 10 provided by the first (R)AN node 1, has been allowed to use S-NSSAI-1, and has been conditionally allowed to use S-NSSAI-2. Put another way, the Allowed NSSAI configured by the AMF 3 includes S-NSSAI-1, while the Conditional NSSAI configured by the AMF 3 includes S-NSSAI-2.

In step 1102, the UE 4 determines reselection of the cell 20 that supports conditionally allowed S-NSSAI-2. The UE 4 may determine cell reselection according to the operation described in the fifth aspect. The cell 20 may be provided by the second (R)AN node 2. Alternatively, as described above, the cell 20 may be provided by the first (R)AN node 1 that provides the cell 10. The UE 4 may perform the reselection of the cell 20 in step 1102 in response to the arrival of an incoming call to a PDU session associated with S-NSSAI-2. In this case, the AMF 3 sends a paging message including S-NSSAI-2 to the RAN node 1. The RAN node 1 performs a page by associating S-NSSAI-2 received from the AMF3 with an identifier of the UE4. As a result, the UE 4 recognizes the incoming call regarding S-NSSAI-2 and perform the reselection of the cell 20.

In step 1103, the UE 4 reselects the cell 20 and performs an RRC connection establishment procedure in the cell 20.

In step 1104, the UE 4 initiates a PDU session establishment procedure or service request procedure via the cell 20 to establish or activate a PDU session associated with conditional allowed S-NSSAI-2. The PDU session establishment procedure is performed when the UE 4 desires to establish a new PDU session to utilize a network slice (allowed S-NSSAI) already allowed for the UE 4 by the SGC. The service request procedure is used by the UE 4 in the Connection Management (CM)-IDLE state to request an establishment of a secure connection with the AMF 3. In addition, the service request procedure is performed by the UE4 in CM-IDLE or CM-CONNECTED to activate a user plane connection for an established PDU session.

If no PDU session associated with conditionally allowed S-NSSAI-2 has been established, the UE 4 sends a PDU session establishment request message to the AMF 3 via the cell 20. More specifically, the UE 4 sends a NAS message (e.g., UL NAS Transport message) carrying an N1 SM container (PDU Session Establishment Request) to the AMF 3. If a PDU session associated with conditionally allowed S-NSSAI-2 has already been established, the UE 4 sends a service request message to the AMF 3 via the cell 20.

After the communication through the PDU session associated with conditionally allowed S-NSSAI-2 ends, the UE 4 may perform cell reselection to return from the cell 20 supporting conditionally allowed S-NSSAI-2 to the cell 10 supporting allowed S-NSSAI-1. The UE 4 may remain in the cell 10 (or any other cell) that supports allowed S-NSSAI-1 until a new connection to conditionally allowed S-NSSAI-2 is requested by the application layer.

Seventh Aspect

Configuration examples of a radio communication network according to this aspect are the same as the examples described with reference to FIGS. 1A, 1B, 2A, and 2B. This aspect provides an example of network-controlled mobility between the cell 10 supporting allowed S-NSSAI-1 and the cell 20 supporting conditionally allowed S-NSSAI-2.

Figure 12:
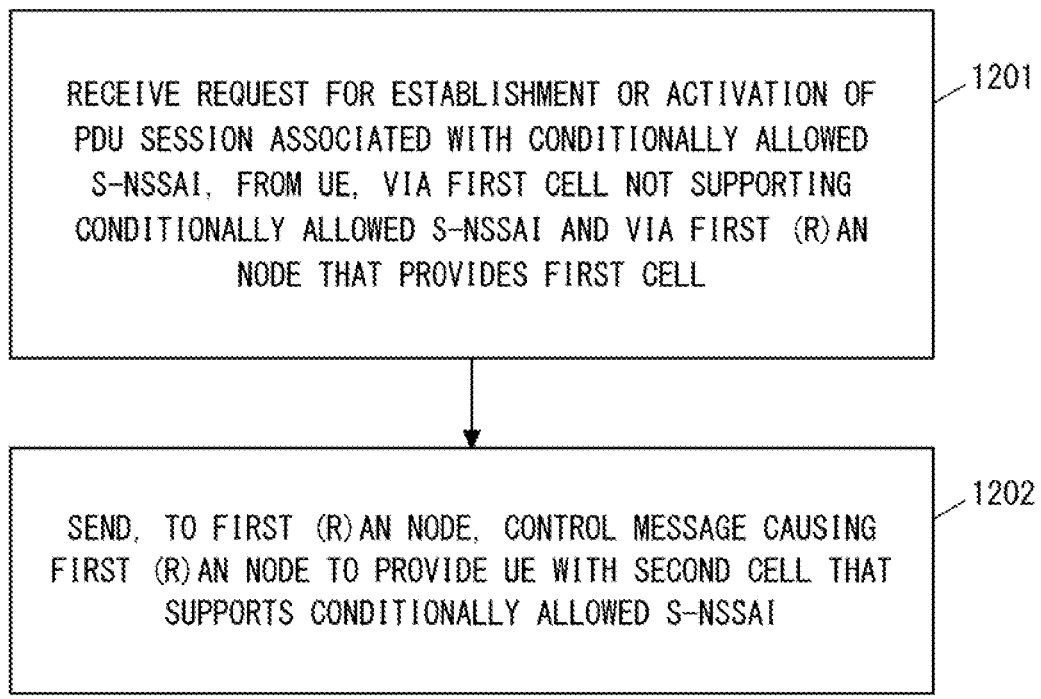
FIG. 12 is a flowchart showing an example of operation of an AMF according to an aspect.

FIG. 12 shows an example of the operation of the AMF 3. In step 1201, the AMF 3 receives a request for the establishment or activation of a PDU session associated with a conditionally allowed S-NSSAI (e.g., S-NSSAI-2), from the UE 4, via a first cell (e.g., cell 10) not supporting the conditionally allowed S-NSSAI and via the first (R)AN node 1 that provides the first cell.

The AMF 3 knows that the conditionally allowed S-NSAI (e.g., S-NSSAI-2) is available in at least one particular cell, at least one particular frequency band, or at least one particular tracking area. In step 1202, the AMF 3 sends a control message (N2 message) to the first (R)AN node 1. The control message triggers the first (R)AN node 1 to provide the UE 4 with a second cell (e.g., cell 20) that supports the conditionally allowed S-NSSAI (e.g., S-NSSAI-2). In other words, the control message prompts the first (R)AN node 1 to allow the UE 4 to use a radio connection with the second cell (e.g., cell 20) supporting the conditionally allowed S-NSSAI (e.g., S-NSSAI-2). More specifically, the control message causes the first (R)AN node 1 to move the UE 4 to the second cell (e.g., cell 20) supporting the conditionally allowed S-NSSAI (e.g., S-NSSAI-2) or add the second cell as a secondary cell for the UE 4. The second cell (e.g., cell 20) may be provided by the second (R)AN node 2. In this case, the control message causes the first (R)AN node 1 to move (or hand over) the UE 4 to the second (R)AN node 2, which provides the second cell (e.g., cell 20) supporting the conditionally allowed S-NSSAI (e.g., S-NS- SAI-2), or to request the second (R)AN node 2 to add the second cell as a secondary cell for the UE 4.

The control message may indicate the conditionally allowed S-NSSAI (e.g., S-NSSAI-2). Additionally, or alternatively, the control message may indicate an identifier (e.g., TAI) of at least one of at least one particular tracking area in which the conditionally allowed S-NSSAI (e.g., S-NSSAI-2) is available. Additionally, or alternatively, the control message may indicate an identifier (e.g., NR-ARFCN) of at least one of at least one particular frequency band in which the conditionally allowed S-NSSAI (e.g., S-NSSAI-2) is available. Additionally, or alternatively, the control message may indicate an identifier (e.g., Cell Global Identifier (CGI)) of at least one of at least one particular cell in which the conditionally allowed S-NSSAI (e.g., S-NSSAI-2) is available. The control message may be a PDU SESSION RESOURCE SETUP REQUEST message or a PDU SESSION RESOURCE MODIFY REQUEST message extended to indicate at least one of these identifiers.

In some implementations, the control message causes the first (R)AN node 1 to hand over or redirect the UE 4 to the second cell (e.g., cell 20) supporting the conditionally allowed S-NSSAI (e.g., S-NSSAI-2). In other implementations, the control message causes the first (R)AN node 1 to add the second cell (e.g., cell 20) as a secondary cell of carrier aggregation or dual connectivity for the UE 4. The second cell (e.g., cell 20) may be provided by the second (R)AN node 2. In this case, the control message causes the first (R)AN node 1 to move (or hand over) the UE 4 to the second (R)AN node 2, which provides the second cell (e.g., cell 20) supporting the conditionally allowed S-NSSAI (e.g., S-NSSAI-2), or to request the second (R)AN node 2 to add the second cell as a secondary cell for the UE 4.

Figure 13:
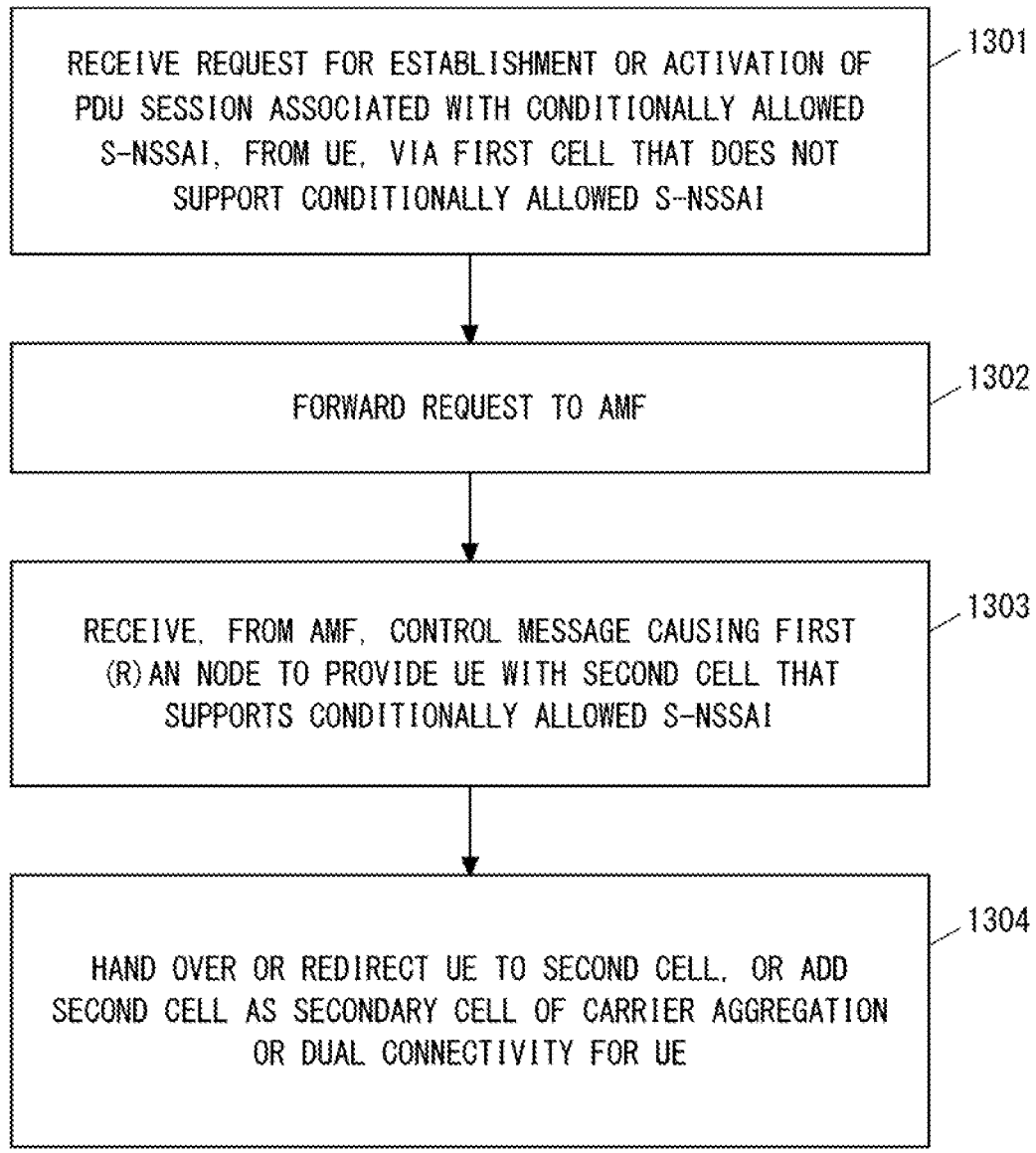
FIG. 13 is a flowchart showing an example of operation of a (R)AN node according to an aspect.

FIG. 13 shows an example of the operation of the first (R)AN node 1. In step 1301, the first (R)AN node 1 receives a request for establishment or activation of a PDU session associated with a conditionally allowed S-NSSAI (e.g., S-NSSAI-2), from the UE 4, via a first cell (e.g., cell 10) that does not support the conditionally allowed S-NSSAI (e.g., S-NSSAI-2). In step 1302, the first (R)AN node 1 forwards the received request to the AMF 3.

In step 1303, the first (R)AN node 1 receives a control message (N2 message) from the AMF 3. The control message causes the first (R)AN node 1 to provide the UE 4 with a second cell (e.g., cell 20) that supports the conditionally allowed S-NSSAI (e.g., S-NSSAI-2). In other words, the control message prompts the first (R)AN node 1 to allow the UE 4 to use a radio connection with the second cell (e.g., cell 20) supporting the conditionally allowed S-NSSAI (e.g., S-NSSAI-2). More specifically, the control message causes the first (R)AN node 1 to move the UE 4 to the second cell (e.g., cell 20) supporting the conditionally allowed S-NSSAI (e.g., S-NSSAI-2) or add the second cell as a secondary cell for the UE 4. The second cell (e.g., cell 20) may be provided by the second (R)AN node 2. In this case, the control message causes the first (R)AN node 1 to move (or hand over) the UE 4 to the second (R)AN node 2, which provides the second cell (e.g., cell 20) supporting the conditionally allowed S-NSSAI (e.g., S-NSSAI-2), or to request the second (R)AN node 2 to add the second cell as a secondary cell for the UE 4.

In step 1304, in response to the control message from the AMF 3, the first (R)AN node 1 hands over or redirects the UE 4 to the second cell. Alternatively, in response to the control message from the AMF 3, the first (R)AN node 1 adds the second cell as a secondary cell of carrier aggregation or dual connectivity for the UE 4.

In some implementation, the control message from the AMF 3 may indicate the conditionally allowed S-NSSAI (e.g., S-NSSAI-2). In this case, the first (R)AN node 1 may select a cell, (R)AN node or tracking area that supports the conditionally allowed S-NSSAI (e.g., S-NSSAI-2) as a target cell, target AN node or target tracking area to which the UE 4 is handed over or redirected. Alternatively, the first (R)AN node 1 may add a cell or (R)AN node that supports the conditionally allowed S-NSSAI (e.g., S-NSSAI-2), as a secondary cell or a secondary node of carrier aggregation or dual connectivity for the UE 4.

In some implementations, the control message from the AMF 3 may indicate an identifier (e.g., TAI) of at least one of at least one particular tracking area in which the conditionally allowed S-NSSAI (e.g., S-NSSAI-2) is available. In this case, the first (R)AN node 1 may select a cell belonging to the tracking area associated with this identifier or a (R)AN node providing this cell, as a target cell or target (R)AN node to which the UE 4 is handed over or redirected. Alternatively, the first (R)AN node 1 may add a cell belonging to the tracking area associated with this identifier or a (R)AN node providing this cell, as a secondary cell or a secondary node of carrier aggregation or dual connectivity for the UE 4.

In some implementations, the control message from the AMF 3 may indicate an identifier (e.g., NR-ARFCN) of at least one of at least one particular frequency band in which the conditionally allowed S-NSSAI (e.g., S-NSSAI-2) is available. In this case, the first (R)AN node 1 may select a cell operating in the frequency band associated with this identifier or a (R)AN node providing this cell, as a target cell or target (R)AN node to which the UE 4 is handed over or redirected. Alternatively, the first (R)AN node 1 may add a cell operating in the frequency band associated with this identifier or a (R)AN node providing this cell, as a secondary cell or a secondary node of carrier aggregation or dual connectivity for the UE 4.

In some implementations, the control message from the AMF 3 may indicate an identifier (e.g., CGI) of at least one of at least one particular cell in which conditionally allowed S-NSSAI (e.g., S-NSSAI-2) is available. In this case, the first (R)AN node 1 may select a cell associated with this identifier or a (R)AN node providing this cell, as a target cell or target (R)AN node to which the UE 4 is handed over or redirected. Alternatively, the first (R)AN node 1 may add a cell associated with this identifier or a (R)AN node providing this cell, as a secondary cell or a secondary node of carrier aggregation or dual connectivity for the UE 4.

Figure 14:
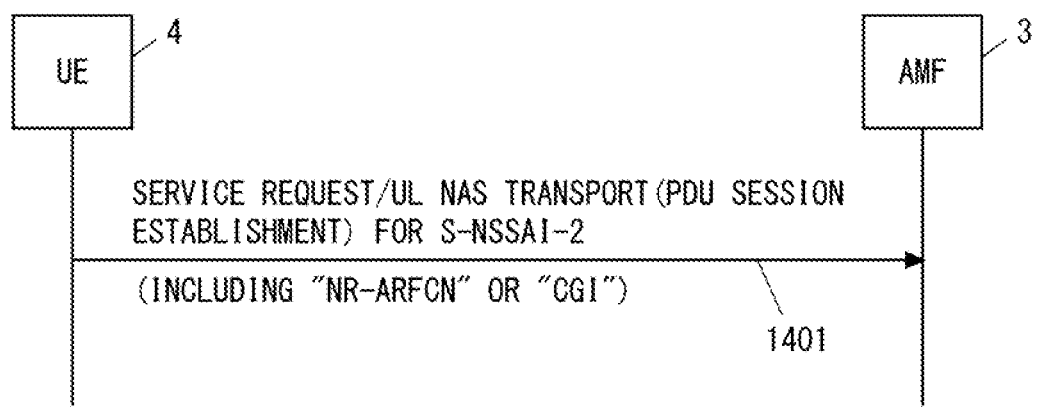
FIG. 14 is a sequence diagram showing an example of signaling according to an aspect.

The UE 4 may operate as shown in FIG. 14 to assist the operations of the AMF 3 and (R)AN node 1 described with reference to FIGS. 12 and 13. In step 1401, the UE 4 incorporates an identifier (e.g., CGI or NR-ARFCN) of a cell or frequency band in which a conditionally allowed S-NSSAI (e.g., S-NSSAI-2) is available, into a NAS message to be sent to the AMF 3 to request an establishment or activation of a PDU session associated with the conditionally allowed S-NSSAI. The NAS message may be a Service Request message. Alternatively, the NAS message may be a NAS message (e.g., UL NAS Transport message) carrying an Ni SM container (PDU Session Establishment Request).

In some implementations, a cell may broadcast a list of network slice identifiers (S-NSSAIs) that are available through the cell. In this case, the UE 4 may search for a cell in which the conditionally allowed S-NSSAI (e.g., S-NSSAI-2) is available and include the identifier of the found cell in the NAS message of step 1401. Alternatively, the UE 4 may search for a cell of the frequency band (e.g., FB-2) associated with the conditionally allowed S-NSSAI (e.g., S-NSSAI-2) in a registration procedure, and then incorporate the identifier of the found cell in the NAS message of step 1401. Alternatively, the UE 4 may search for a cell belonging to the tracking area (e.g., TAI-2) associated with the conditionally allowed S-NSSAI (e.g., S-NSSAI-2) in a registration procedure, and then include the identifier of the found cell into the NAS message of step 1401.

The AMF 3 refers to the cell or frequency band identifier (e.g., CGI or NR-ARFCN) received from the UE 4. This allows the AMF 3 to recognize the cell or frequency band to which the UE 4 should be transferred (or the cell or frequency band that should be added for the UE4).

Figure 15:
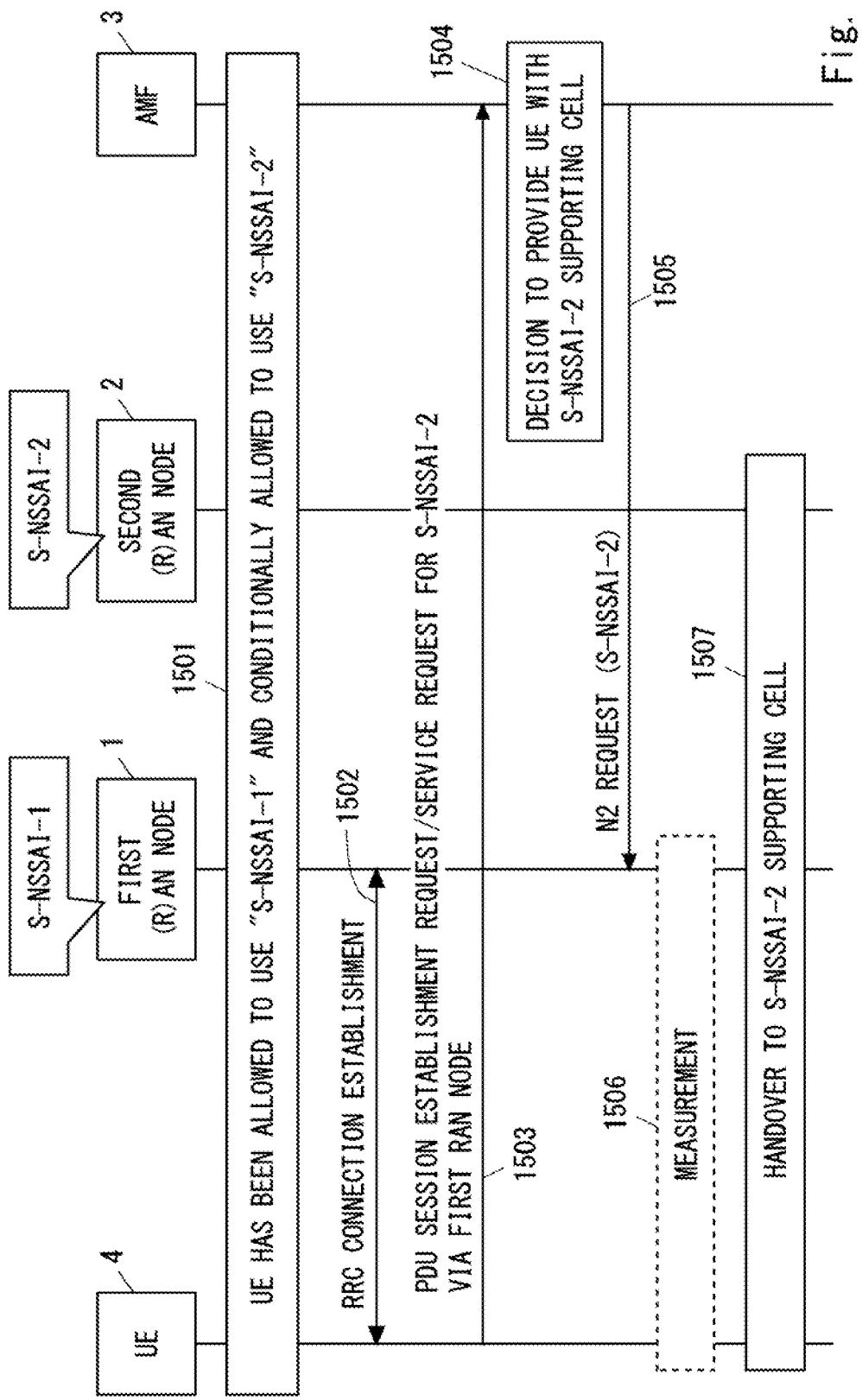
FIG. 15 is a sequence diagram showing an example of signaling according to an aspect.

FIG. 15 shows an example of a handover of the UE 4. In step 1501, the UE 4 has completed a registration procedure via the cell 10 provided by the first (R)AN node 1, has been allowed to use S-NSSAI-1, and has been conditionally allowed to use S-NSSAI-2. Put another way, the Allowed NSSAI configured by the AMF 3 includes S-NSSAI-1, while the Conditional NSSAI configured by the AMF 3 includes S-NSSAI-2.

In steps 1502 and 1503, the UE 4 requests to the AMF 4, via the cell 10 of the first (R)AN node 1, to establish or activate a PDU session associated with conditionally allowed S-NSSAI-2. The UE 4 may decide to establish or activate the PDU session according to the operations described in the fifth and sixth aspects.

More specifically, in step 1502, the UE 4 performs an RRC connection establishment procedure in the cell 10 of the first (R AN node 1. In step 1503, the UE 4 initiates a PDU session establishment procedure or service request procedure via the cell 10 to establish or activate the PDU session associated with conditionally allowed S-NSSAI-2. If the PDU session associated with t conditionally allowed S-NSSAI-2 has not been established, the UE 4 sends a PDU session establishment request message to the AMF 3 via the cell 10. More specifically, UE 4 sends a NAS message (e.g., UL NAS Transport message) carrying an N1 SM container (PDU Session Establishment Request) to the AMF 3. If the PDU session associated with conditionally allowed S-NSSAI-2 has been established, the UE 4 sends a service request message to the AMF 3 via the cell 10. The service request message may be an Extended Service Request message. As described with reference to FIG. 14, the UE 4 may set an identifier (e.g., CGI or NR-ARFCN) of a cell or frequency band in which conditionally allowed S-NSSAI-2 is available, to the NAS message of step 1503.

In step 1504, the AMF 3 decides to provide the UE 4 with a cell (e.g., cell 20) that supports conditionally allowed S-NSSAI-2. Through an NG Setup procedure or RAN Configuration Update procedure, the AMF 3 has already known the S-NSSAIs supported in each TA supported by the first (R)AN node 1. Further, the AMF 3 can know the position information of the UE 4, that is, the identifier (CGI) and TAI of the cell 10 to which the UE 4 is connected from the N2 message (e.g., INITIALUEMESSAGE) carrying the NAS message in step 1503. This allows the AMF 3 to be aware that conditionally allowed S-NSSAI-2 is not available in the cell 10. In addition, the AMF 3 knows which (R)AN nodes and TAs support conditionally allowed S-NSSAI-2. The AMF 3 may further consider the cell or frequency band identifier (e.g., CGI or NR-ARFCN) which has been received from UE4 and in which conditionally allowed S-NSSAI-2 is available. Based on these knowledge, the AMF 3 may determine a target (R)AN node, target tracking area, target cell, or target frequency band to which the UE 4 should be moved (or that should be added for the UE 4).

In step 1505, the AMF 3 sends an N2 request message to the first (R)AN node 1. The N2 request message indicates conditionally allowed S-NSSAI-2. In addition, the N2 request message may indicate the target (R)AN node, target tracking area, target cell, or target frequency band to which the UE 4 should be moved (or that should be added for the UE 4). The N2 request message causes the first (R)AN node 1 to hand over the UE 4 to the cell 20 that supports conditionally allowed S-NSSAI-2. The cell 20 may be provided by the second (R)AN node 2. Alternatively, as described above, the cell 20 may be provided by the first (R)AN node 1 that also provides the cell 10.

In step 1506, the first (R)AN node 1 may have the UE 4, which is in RRC_CONNECTED, perform inter-frequency measurement. If the first (R)AN node 1 has already received a measurement result from the UE 4, the measurement in step 1506 may be skipped.

In step 1507, if the cell 20 supporting conditionally allowed S-NSSAI-2 is available at the location of the UE 4, the first (R)AN node 1 initiates a handover procedure to move the UE 4 to the cell 20. After the handover to the cell 20 is complete, the UE 4 may request the AMF 3 via the cell 20 to establish or activate a PDU session associated with conditionally allowed S-NSSAI-2.

After the communication through the PDU session associated with conditionally allowed S-NSSAI-2 ends, the UE 4 may perform cell reselection to return from the cell 20 supporting conditionally allowed S-NSSAI-2 to the cell 10 supporting allowed S-NSSAI-1. The UE 4 may remain in the cell 10 (or any other cell) that supports allowed S-NSSAI-1 until a new connection to conditionally allowed S-NSSAI-2 is requested by an application layer.

Figure 16:
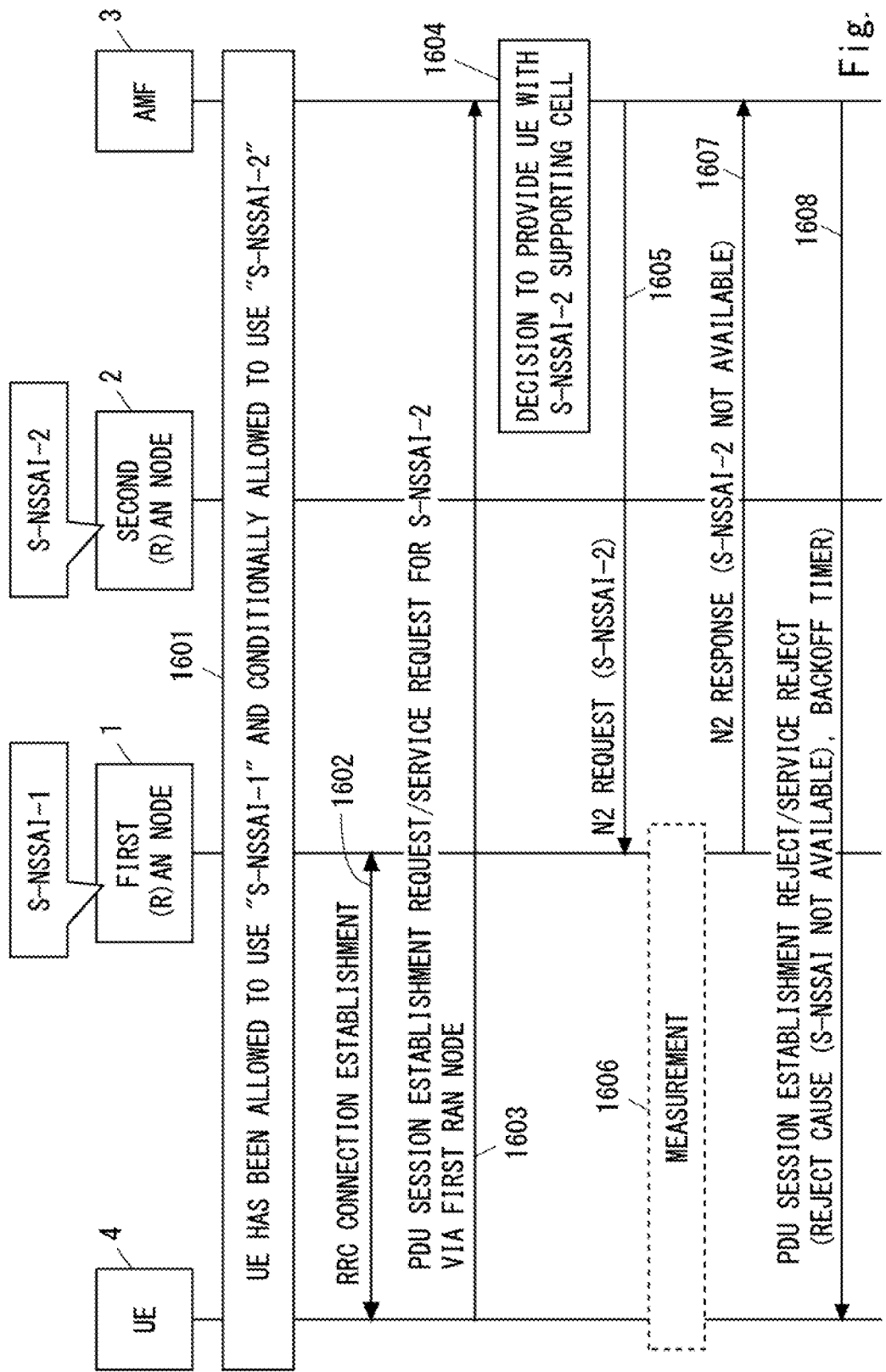
FIG. 16 is a sequence diagram showing an example of signaling according to an aspect.

FIG. 16 shows an example of a failure of a handover of the UE 4. Steps 1601 to 1606 are similar to steps 1501 to 1506 in FIG. 15. In step 1607, if the cell 20 supporting conditionally allowed S-NSSAI-2 is not available at the location of the UE 4, the (R)AN node 1 sends an N2 response message to the AMF 3. The N2 response message indicates that conditionally allowed S-NSSAI-2 is not available at the UE location. In step 1608, the AMF 3 rejects the request for the establishment or activation of the PDU session from the UE 4. The reject message in step 1608 may indicate a reject cause (e.g., S-NSSAI not available). The reject message may indicate a backoff timer value.

Figure 17:
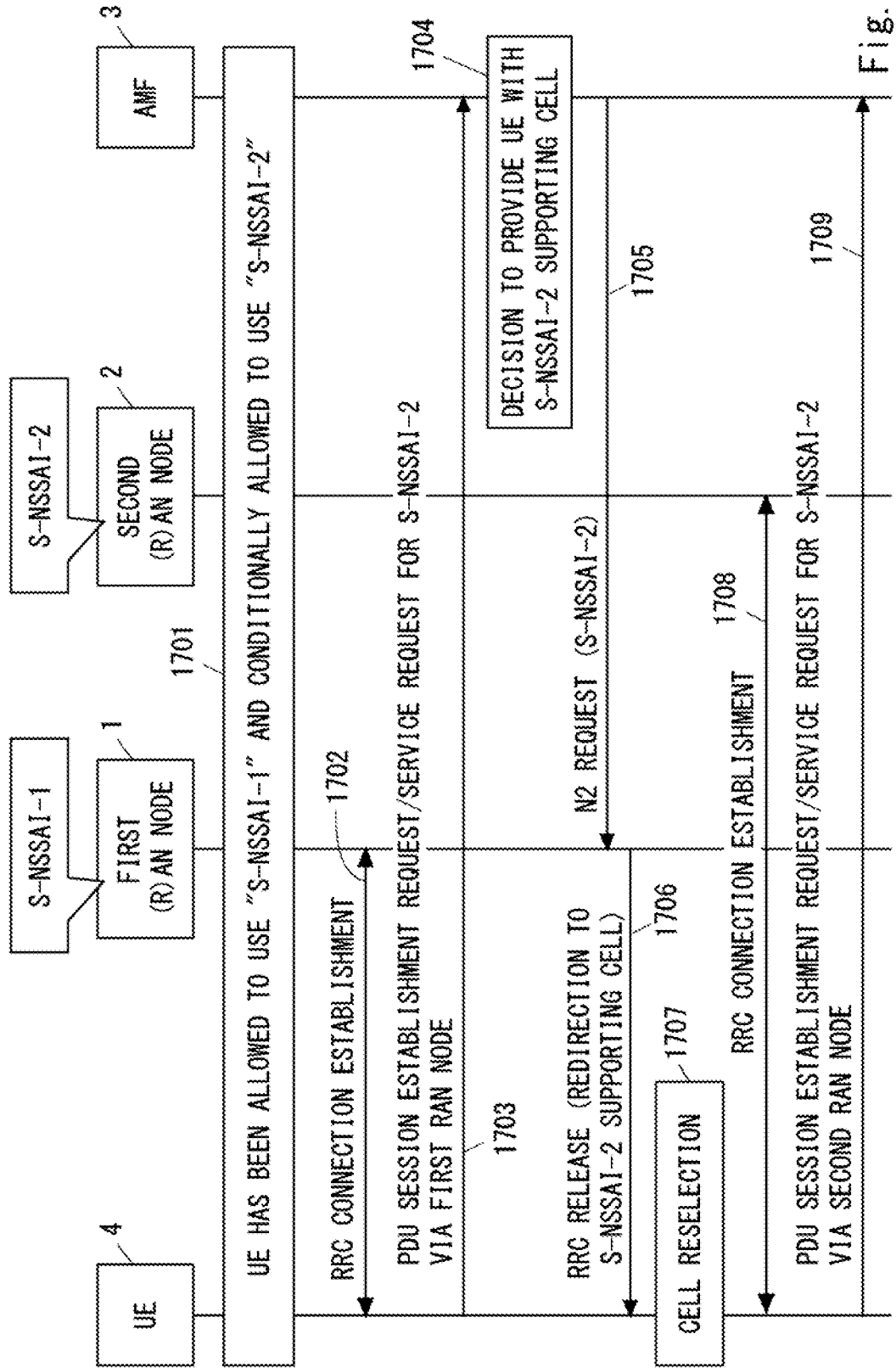
FIG. 17 is a sequence diagram showing an example of signaling according to an aspect.

FIG. 17 shows an example of redirection of the UE 4. Steps 1701 to 1705 are similar to steps 1501 to 1505 of FIG. 15. In step 1706, the first (R)AN node 1 transmits an RRC Release message to the UE 4. The RRC Release message includes an indication indicating redirection to a cell that supports S-NSSAI-2. The RRC Release message may indicate one or any combination of a tracking area identifier (e.g., TAI), cell identifier (e.g., CGI), and frequency band identifier (e.g., ARFCN) in which S-NSSAI-2 is available.

In step 1707, the UE 4 performs cell reselection. In step 1708, the UE 4 reselects the cell 20 that supports S-NSSAI-2 and performs an RRC connection establishment procedure in the cell 20. The cell 20 may be provided by the second (R)AN node 2. Alternatively, as described above, the cell 20 may be provided by the first (R)AN node 1 that also provides the cell 10. In step 1709, the UE 4 requests the AMF 3 via the cell 20 to establish or activate a PDU session associated with conditionally allowed S-NSSAI-2.

After the communication through the PDU session associated with the conditionally allowed S-NSSAI-2 ends, the UE 4 may perform cell reselection to return from the cell 20 supporting conditionally allowed S-NSSAI-2 to the cell 10 supporting allowed S-NSSAI-1. The UE 4 may remain in the cell 10 (or any other cell) that supports allowed S-NSSAI-1 until a new connection to conditionally allowed S-NSSAI-2 is requested by an application layer.

Figure 18:
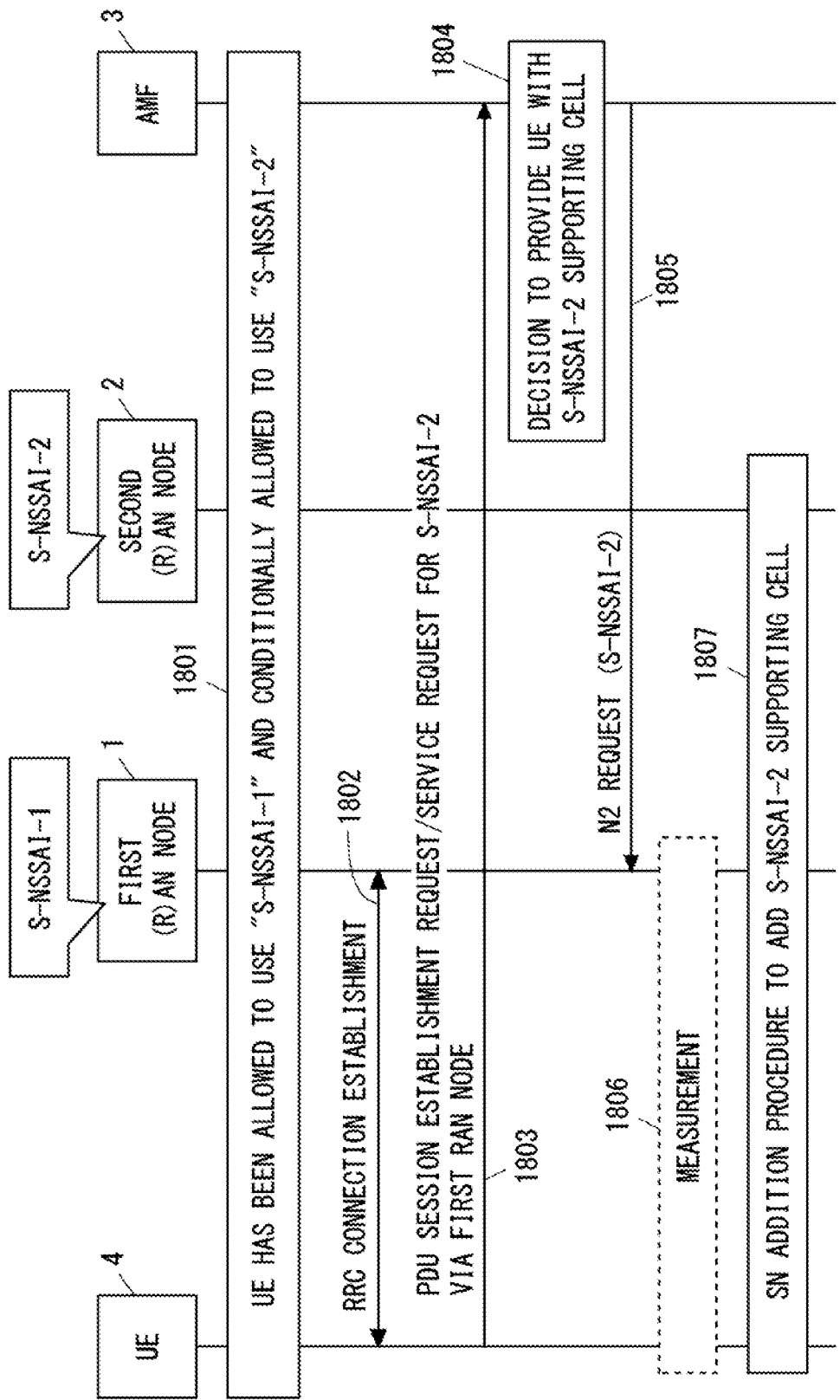
FIG. 18 is a sequence diagram showing an example of signaling according to an aspect.

FIG. 18 shows an example of dual connectivity (DC). Steps 1801 to 1804 are similar to steps 1501 to 1504 in FIG. 15. In step 1805, the AMF 3 sends to the first (R)AN node 1 an N2 message including an information element about the PDU session associated with S-NSSAI-2 (e.g., PDU Session ID, PDU Session NAS-PDU, S-NSSAI, and PDU Session Resource Setup/Modify Request Transfer). The N2 request message in step 1805 may indicate an identifier (e.g., NR-ARFCN) of a frequency band in which conditionally allowed S-NSSAI-2 is available. Additionally, or alternatively, the N2 request message may indicate an identifier (e.g., CGI) of a cell in which conditionally allowed S-NSSAI-2 is available. The N2 request message may be a PDU SESSION RESOURCE SETUP REQUEST message or a PDU SESSION RESOURCE MODIFY REQUEST message extended to indicate at least one of these identifiers. This allows the AMF 3 to specify (or indicate or request) the cell to be used as a secondary cell for DC, or its frequency band, to the first (R)AN node 1.

In step 1806, the first (R)AN node 1 may have the UE 4, which is in RRC_CONNECTED, perform inter-frequency measurement. If the first (R)AN node 1 has already received a measurement result from the UE 4, the measurement in step 1806 may be skipped.

In step 1807, the first (R)AN node 1 performs an SN addition procedure in order to add the cell 20 supporting S-NSSAI-2 as a secondary cell (SCG cell). More specifically, the first (R)AN node 1 sends an SN Addition Request message to the second (R)AN node 2. The second (R)AN node 2 sends an SN Addition Request Acknowledge message to the first (R)AN node 1. The SN Addition Request Acknowledge message includes an SN RRC message. Then, the first (R)AN node 1 transmits an MN RRC Reconfiguration message to the UE 4. The MN RRC Reconfiguration message includes the SN RRC message received from the second (R)AN node 2, and also includes an N1 SM container (e.g., PDU Session Establishment Accept) received from the AMF 3. After that, with respect to a radio bearer in the cell 20, the first (R)AN node 1 (or the second (R)AN node 2) sets or update a user-plane path to the 5GC (User Plane Function (UPF)), through a PDU session path setup or update procedure. As a result, the UE 4 can perform DC using the cell 10 as an MCG cell and the cell 20 as an SCG cell.

The cell 20 may be provided by the first (R)AN node 1 that also provides the cell 10, as in the other examples already described. In this case, the first (R)AN node 1 may perform carrier aggregation instead of dual connectivity.

Figure 19:
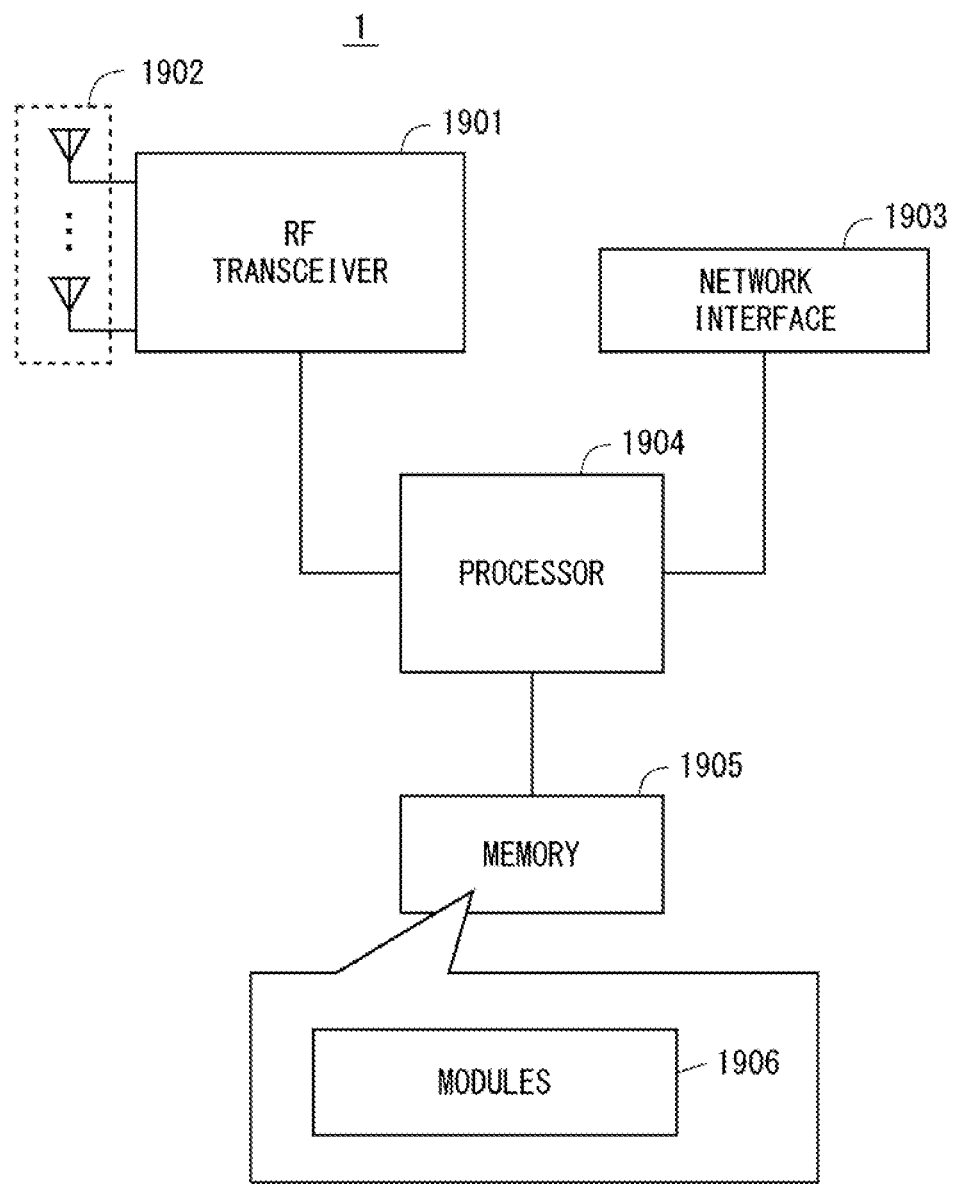
FIG. 19 is a block diagram showing a configuration example of a (R)AN node according to an aspect.

The following provides configuration examples of the (R)AN node 1, the (R)AN node 2, the AMF 3, and the UE 4 according to the above-described aspects. FIG. 19 is a block diagram showing a configuration example of the (R)AN node 1 according to the above-described aspects. The (R)AN node 2 may have a configuration similar to that shown in FIG. 19. Referring to FIG. 19, the (R)AN node 1 includes a Radio Frequency (RF) transceiver 1901, a network interface 1903, a processor 1904, and a memory 1905. The RF transceiver 1901 performs analog RF signal processing to communicate with UEs. The RF transceiver 1901 may include a plurality of transceivers. The RF transceiver 1901 is coupled to an antenna array 1902 and the processor 1904. The RF transceiver 1901 receives modulated symbol data from the processor 1904, generates a transmission RF signal, and supplies the transmission RF signal to the antenna array 1902. Further, the RF transceiver 1901 generates a baseband reception signal based on a reception RF signal received by the antenna array 1902 and supplies the baseband reception signal to the processor 1904. The RF transceiver 1901 may include an analog beamformer circuit for beam forming. The analog beamformer circuit includes, for example, a plurality of phase shifters and a plurality of power amplifiers.

The network interface 1903 is used to communicate with network nodes (e.g., other (R)AN nodes, AMF, and User Plane Function (UPF)). The network interface 1903 may include, for example, a network interface card (NIC) conforming to the IEEE 802.3 series.

The processor 1904 performs digital baseband signal processing (i.e., data-plane processing) and control-plane processing for radio communication. The processor 1904 may include a plurality of processors. The processor 1904 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing.

The digital baseband signal processing by the processor 1904 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. The control-plane processing performed by the processor 1904 may include processing of Non-Access Stratum (NAS) messages, RRC messages, MAC CEs, and DCIs.

The processor 1904 may include a digital beamformer module for beam forming. The digital beamformer module may include a Multiple Input Multiple Output (MIMO) encoder and a pre-coder.

The memory 1905 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1905 may include a storage located apart from the processor 1904. In this case, the processor 1904 may access the memory 1905 via the network interface 1903 or an I/O interface.

The memory 1905 may store one or more software modules (computer programs) 1906 including instructions and data to perform processing by the (R)AN node 1 described in the above aspects. In some implementations, the processor 1904 may be configured to load the software modules 1906 from the memory 1905 and execute the loaded software modules, thereby performing processing of the (R)AN node 1 described in the above aspects.

When the (R)AN node 1 is a Central Unit (e.g., gNB-CU) in the C-RAN deployment, the (R)AN node 1 does not need to include the RF transceiver 1901 (and the antenna array 1902).

Figure 20:
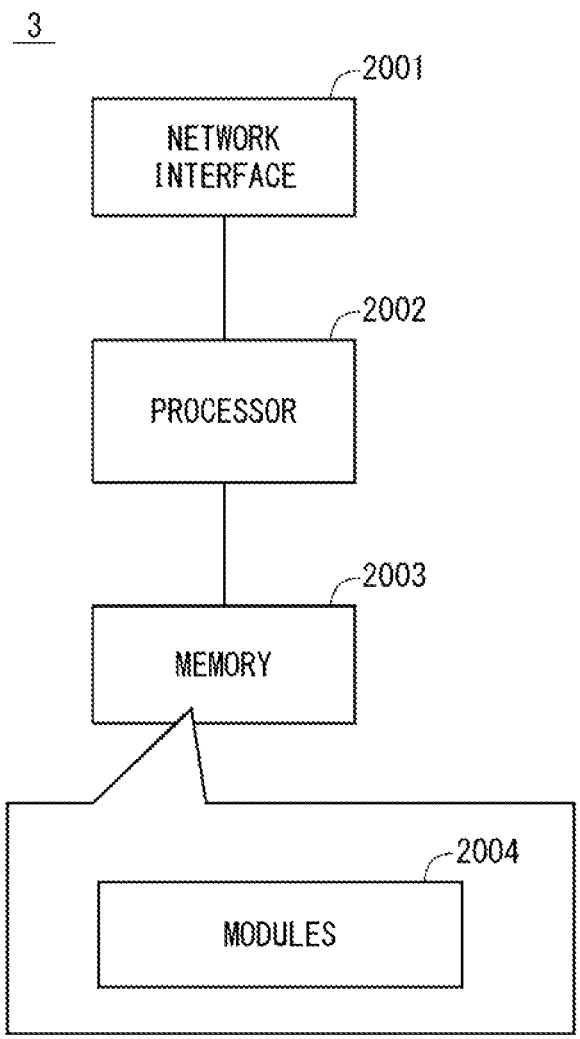
FIG. 20 is a block diagram showing a configuration example of an AMF according to an aspect.

FIG. 20 is a block diagram showing a configuration example of the AMF 3. Referring to FIG. 20, the AMF 3 includes a network interface 2001, a processor 2002, and a memory 2003. The network interface 2001 is used to communicate, for example, with (R)AN nodes and with other network functions (NFs) or nodes in the 5GC. The other NFs or nodes in the 5GC include, for example, UDM, AUSF, SMF, and PCF. The network interface 2001 may include, for example, a network interface card (NIC) conforming to the IEEE 802.3 series.

The processor 2002 may be, for example, a microprocessor, a Micro Processing Unit (MPU), or a Central Processing Unit (CPU). The processor 2002 may include a plurality of processors.

The memory 2003 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2003 may include a storage located apart from the processor 2002. In this case, the processor 2002 may access the memory 2003 via the network interface 2001 or an I/O interface.

The memory 2003 may store one or more software modules (computer programs) 2004 including instructions and data to perform the processing of the AMF 3 described in the above aspects. In some implementations, the processor 2002 may be configured to load the one or more software modules 2004 from the memory 2003 and execute the loaded software modules, thereby performing the processing of the AMF 3 described in the above aspects.

Figure 21:
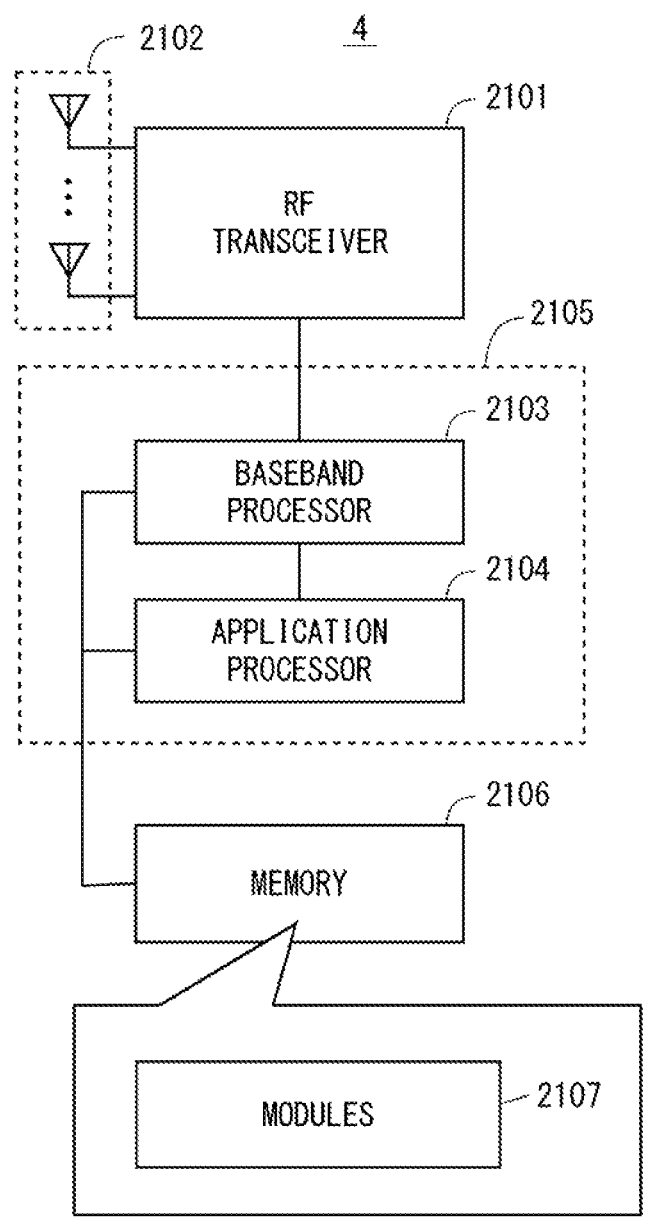
FIG. 21 is a block diagram showing a configuration example of a UE according to an aspect.

FIG. 21 is a block diagram showing a configuration example of the UE 4. A Radio Frequency (RF) transceiver 2101 performs analog RF signal processing to communicate with (R)AN nodes. The RF transceiver 2101 may include a plurality of transceivers. The analog RF signal processing performed by the RF transceiver 2101 includes frequency up-conversion, frequency down-conversion, and amplification. The RF transceiver 2101 is coupled to an antenna array 2102 and a baseband processor 2103. The RF transceiver 2101 receives modulated symbol data (or OFDM symbol data) from the baseband processor 2103, generates a transmission RF signal, and supplies the transmission RF signal to the antenna array 2102. Further, the RF transceiver 2101 generates a baseband reception signal based on a reception RF signal received by the antenna array 2102 and supplies the baseband reception signal to the baseband processor 2103. The RF transceiver 2101 may include an analog beamformer circuit for beam forming. The analog beamformer circuit includes, for example, a plurality of phase shifters and a plurality of power amplifiers.

The baseband processor 2103 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 2103 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing performed by the baseband processor 2103 may include processing of Non-Access Stratum (NAS) protocols, Radio Resource Control (RRC) protocols, and MAC Control Elements (CEs).

The baseband processor 2103 may perform Multiple Input Multiple Output (MIMO) encoding and pre-coding for beam forming.

The baseband processor 2103 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 2104 described in the following.

The application processor 2104 is also referred to as a CPU, an MPU, a microprocessor, or a processor core. The application processor 2104 may include a plurality of processors (or processor cores). The application processor 2104 loads a system software program (Operating System (OS)) and various application programs (e.g., a call application, a WEB browser, a mailer, a camera operation application, and a music player application) from a memory 2106 or from another memory and executes these programs, thereby providing various functions of the UE 4.

In some implementations, as represented by a dashed line (2105) in FIG. 21, the baseband processor 2103 and the application processor 2104 may be integrated on a single chip. In other words, the baseband processor 2103 and the application processor 2104 may be implemented in a single System on Chip (SoC) device 2105. An SoC device may be referred to as a Large-Scale Integration (LSI) or a chipset.

The memory 2106 is a volatile memory, a non-volatile memory, or a combination thereof. The memory 2106 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2106 may include, for example, an external memory device that can be accessed from the baseband processor 2103, the application processor 2104, and the SoC 2105. The memory 2106 may include an internal memory device that is integrated in the baseband processor 2103, the application processor 2104, or the SoC 2105. Further, the memory 2106 may include a memory in a Universal Integrated Circuit Card (UICC).

The memory 2106 may store one or more software modules (computer programs) 2107 including instructions and data to perform the processing by the UE 4 described in the above aspects. In some implementations, the baseband processor 2103 or the application processor 2104 may load these software modules 2107 from the memory 2106 and execute the loaded software modules, thereby performing the processing of the UE 4 described in the above aspects with reference to the drawings.

The control-plane processing and operations performed by the UE 4 described in the above aspects can be achieved by elements other than the RF transceiver 2101 and the antenna array 2102, i.e., achieved by the memory 2106, which stores the software modules 2107, and one or both of the baseband processor 2103 and the application processor 2104.

As described above with reference to FIGS. 19, 20, and 21, each of the processors that the (R)AN node 1, the (R)AN node 2, the AMF 3, and the UE 4 according to the above aspects include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Other Aspects

Each of the above aspects may be used individually, or whole or a part of the aspects may be appropriately combined with one another.

The above-described aspects are merely examples of applications of the technical ideas obtained by the inventors. These technical ideas are not limited to the above-described aspects and various modifications can be made thereto.

The whole or part of the embodiments disclosed above can be described as, but not limited to, the following supplementary notes.

Supplementary Note 1

An Access and Mobility management Function (AMF) apparatus comprising:
at least one memory; and
at least one processor coupled to the at least one memory and configured to:
receive a Non-Access Stratum (NAS) message for requesting a core network to establish or activate a protocol data unit (PDU) session associated with an allowed network slice identifier, from a User Equipment (UE), via a first cell not supporting the allowed network slice identifier and via a first access network (AN) node that provides the first cell; and
send a control message to the first AN node in response to receiving the NAS message, the control message causing the first AN node to move the UE to a second cell that supports the allowed network slice identifier or add the second cell as a secondary cell for the UE.

Supplementary Note 2

The AMF apparatus according to Supplementary Note 1, wherein
the allowed network slice identifier is a conditionally allowed network slice identifier, and
the conditionally allowed network slice identifier is not available in every part of a registration area which is composed of a plurality of tracking areas, but is available in at least one particular tracking area included in the registration area.

Supplementary Note 3

The AMF apparatus according to Supplementary Note 1 or 2, wherein the control message indicates the allowed network slice identifier.

Supplementary Note 4

The AMF apparatus according to any one of Supplementary Notes 1 to 3, wherein the control message indicates an identifier of at least one of at least one particular tracking area in which the allowed network slice identifier is available.

Supplementary Note 5

The AMF apparatus according to any one of Supplementary Notes 1 to 4, wherein the control message indicates an identifier of at least one of at least one particular cell in which the allowed network slice identifier is available.

Supplementary Note 6

The AMF apparatus according to any one of Supplementary Notes 1 to 5, wherein the control message indicates an identifier of a frequency band in which a network slice corresponding to the allowed network slice identifier is provided.

Supplementary Note 7

The AMF apparatus according to any one of Supplementary Notes 1 to 6, wherein the control message causes the first AN node to hand over or redirect the UE to the second cell.

Supplementary Note 8

The AMF apparatus according to any one of Supplementary Notes 1 to 6, wherein the control message causes the first AN node to add the second cell as the secondary cell of carrier aggregation or dual connectivity for the UE.

Supplementary Note 9

The AMF apparatus according to any one of Supplementary Notes 1 to 8, wherein
the second cell is provided by a second AN node, and
the control message causes the first AN node to move the UE to the second AN node, which provides the second cell supporting the allowed network slice identifier, or to request the second node to add the second cell as the secondary cell for the UE.

Supplementary Note 10

An access network (AN) node comprising:
at least one memory; and
at least one processor coupled to the at least one memory and configured to:
receive a Non-Access Stratum (NAS) message sent from a User Equipment (UE) for requesting a core network to establish or activate a protocol data unit (PDU) session associated with an allowed network slice identifier, via a first cell not supporting the allowed network slice identifier;

forward the NAS message to the core network;
receive a control message from the core network, the control message causing the first AN node to move the UE to a second cell that supports the allowed network slice identifier or add the second cell as a secondary cell for the UE; and
in response to the control message, hand over or redirect the UE to the second cell supporting the allowed network slice identifier, or add the second cell as a secondary cell of carrier aggregation or dual connectivity for the UE.

Supplementary Note 11

The AN node according to Supplementary Note 10, wherein
the allowed network slice identifier is a conditionally allowed network slice identifier, and
the conditionally allowed network slice identifier is not available in every part of a registration area which is composed of a plurality of tracking areas, but is available in at least one particular tracking area included in the registration area.

Supplementary Note 12

The AN node according to Supplementary Note 10 or 11, wherein the control message indicates the allowed network slice identifier.

Supplementary Note 13

The AN node according to Supplementary Note 12, wherein the at least one processor is configured to select a cell, AN node or tracking area that supports the allowed network slice identifier as a target cell, target AN node or target tracking area to which the UE is handed over or redirected.

Supplementary Note 14

The AN node according to Supplementary Note 12, wherein the at least one processor is configured to add a cell or AN node that supports the allowed network slice identifier, as the secondary cell or a secondary node of carrier aggregation or dual connectivity for the UE.

Supplementary Note 15

The AN node according to Supplementary Note 10 or 11, wherein the control message indicates an identifier of at least one of at least one particular tracking area in which the allowed network slice identifier is available.

Supplementary Note 16

The AN node according to Supplementary Note 15, wherein the at least one processor is configured to select a cell belonging to at least one of the at least one particular tracking area or an AN node providing this cell, as a target cell or target AN node to which the UE is handed over or redirected.

Supplementary Note 17

The AN node according to Supplementary Note 15, wherein the at least one processor is configured to add a cell belonging to at least one of the at least one particular tracking area or an AN node providing this cell, as the secondary cell or a secondary node of carrier aggregation or dual connectivity for the UE.

Supplementary Note 18

The AN node according to Supplementary Note 10 or 11, wherein the control message indicates an identifier of a frequency band in which a network slice corresponding to the allowed network slice identifier is provided.

Supplementary Note 19

The AN node according to Supplementary Note 18, wherein the at least one processor is configured to select a cell operating in the frequency band or an AN node providing this cell, as a target cell or target AN node to which the UE is handed over or redirected.

Supplementary Note 20

The AN node according to Supplementary Note 18, wherein the at least one processor is configured to add a cell operating in the frequency band or an AN node providing this cell, as the secondary cell or a secondary node of carrier aggregation or dual connectivity for the UE.

Supplementary Note 21

The AN node according to Supplementary Note 10 or 11, wherein the control message indicates an identifier of at least one of at least one particular cell in which the allowed network slice identifier is available.

Supplementary Note 22

The AN node according to Supplementary Note 21, wherein the at least one processor is configured to select any of the at least one particular cell or an AN node providing this cell, as a target cell or target AN node to which the UE is handed over or redirected.

Supplementary Note 23

The AN node according to Supplementary Note 21, wherein the at least one processor is configured to add any of the at least one particular cell or an AN node providing this cell, as the secondary cell or a secondary node of carrier aggregation or dual connectivity for the UE.

Supplementary Note 24

The AN node according to any one of Supplementary Notes 10 to 23, wherein
the second cell is provided by another AN node, and
the at least one processor is configured to, in response to the control message, hand over or redirect the UE to the another AN node, or send a message for requesting the another AN node to add the second cell as the secondary cell of carrier aggregation or dual connectivity for the UE.

Supplementary Note 25

A method performed by an Access and Mobility management Function (AMF) apparatus, the method comprising:
receiving a Non-Access Stratum (NAS) message for requesting a core network to establish or activate a protocol data unit (PDU) session associated with an allowed network slice identifier, from a User Equipment (UE), via a first cell not supporting the allowed network slice identifier and via a first access network (AN) node that provides the first cell; and sending a control message to the first AN node in response to receiving the NAS message, the control message causing the first AN node to move the UE to a second cell that supports the allowed network slice identifier or add the second cell as a secondary cell for the UE.

Supplementary Note 26

A method performed by an access network (AN) node, the method comprising:

receiving a Non-Access Stratum (NAS) message sent from a User Equipment (UE) for requesting a core network to establish or activate a protocol data unit (PDU) session associated with an allowed network slice identifier, via a first cell not supporting the allowed network slice identifier;

forwarding the NAS message to the core network;

receiving a control message from the core network, the control message causing the first AN node to move the UE to a second cell that supports the allowed network slice identifier or add the second cell as a secondary cell for the UE; and in response to the control message, handing over or redirecting the UE to the second cell supporting the allowed network slice identifier, or adding the second cell as a secondary cell of carrier aggregation or dual connectivity for the UE.

Supplementary Note 27

A program for causing a computer to perform a method for an Access and Mobility management Function (AMF) apparatus, the method comprising:

receiving a Non-Access Stratum (NAS) message for requesting a core network to establish or activate a protocol data unit (PDU) session associated with an allowed network slice identifier, from a User Equipment (UE), via a first cell not supporting the allowed network slice identifier and via a first access network (AN) node that provides the first cell; and sending a control message to the first AN node in response to receiving the NAS message, the control message causing the first AN node to move the UE to a second cell that supports the allowed network slice identifier or add the second cell as a secondary cell for the UE.

Supplementary Note 28

A program for causing a computer to perform a method for an access network (AN) node, the method comprising:

receiving a Non-Access Stratum (NAS) message sent from a User Equipment (UE) for requesting a core network to establish or activate a protocol data unit (PDU) session associated with an allowed network slice identifier, via a first cell not supporting the allowed network slice identifier;

forwarding the NAS message to the core network;

receiving a control message from the core network, the control message causing the first AN node to move the UE to a second cell that supports the allowed network slice identifier or add the second cell as a secondary cell for the UE; and in response to the control message, handing over or redirecting the UE to the second cell supporting the allowed network slice identifier, or adding the second cell as a secondary cell of carrier aggregation or dual connectivity for the UE.

This application is based upon and claims the benefit of priority from Japanese Patent Application No. 2020-067097, filed on Apr. 2, 2020, the disclosure of which is incorporated herein in its entirety by reference.

REFERENCE SIGNS LIST

1 (R)AN node
2 (R)AN node
3 AMF
4 UE
1905 Memory
1906 Modules
2003 Memory
2004 Modules
2103 Baseband Processor
2104 Application Processor
2107 Modules

What is claimed is:

1. An Access and Mobility management Function (AMF) apparatus comprising: at least one memory; and at least one processor coupled to the at least one memory and configured to: receive a first control message for registration, from a User Equipment (UE), via a first access network (AN) node that provides a first cell; and send a second control message to the first AN node in response to receiving the first control message, the second control message including Network Slice Selection Assistance Information (NSSAI) to cause the first AN node to attempt to redirect the UE to a second cell that supports a network slice in the NSSAI, wherein the second control message includes a second information to determine a frequency band for the redirection of the UE.

2. The AMF apparatus according to claim 1, wherein the NSSAI contained in the second control message indicates an allowed network slice identifier corresponding to the network slice, the allowed network slice identifier is a conditionally allowed network slice identifier, and the conditionally allowed network slice identifier is not available in every part of a registration area which is composed of a plurality of tracking areas, but is available in at least one particular tracking area included in the registration area.

3. The AMF apparatus according to claim 1, wherein the NSSAI contained in the second control message indicates a network slice identifier corresponding to the network slice.

4. The AMF apparatus according to claim 1, wherein the second control message indicates an identifier of at least one of at least one particular tracking area in which the network slice is available.

5. The AMF apparatus according to claim 1, wherein the second control message indicates an identifier of at least one of at least one particular cell in which the network slice is available.

6. The AMF apparatus according to claim 1, wherein the second control message causes the first AN node to hand over or redirect the UE to the second cell.

7. The AMF apparatus according to claim 1, wherein the second control message causes the first AN node to add the second cell as the secondary cell of carrier aggregation or dual connectivity for the UE.

8. The AMF apparatus according to claim 1, wherein the second cell is provided by a second AN node, and the second control message causes the first AN node to move the UE to the second AN node, which provides the second cell supporting the network slice, or to request the second node to add the second cell as the secondary cell for the UE.

9. An access network (AN) node configured to provide a first cell, the AN node comprising: at least one memory; and at least one processor coupled to the at least one memory and configured to: receive a first control message sent from a User Equipment (UE) for registration;
forward the first control message to a core network; receive a second control message from the core network in response to sending the first control message, the second control message including Network Slice Selection Assistance Information (NSSAI) to cause the first AN node to attempt to redirect the UE to a second cell that supports a network slice in the NSSAI; and in response to the second control message, hand over or redirect the UE to the second cell supporting the network slice in the NSSAI, wherein the second control message includes a second information to determine a frequency band for the redirection of the UE.

10. The AN node according to claim 9, wherein the NSSAI contained in the second control message indicates an allowed network slice identifier corresponding to the network slice, the allowed network slice identifier is a conditionally allowed network slice identifier, and the conditionally allowed network slice identifier is not available in every part of a registration area which is composed of a plurality of tracking areas, but is available in at least one particular tracking area included in the registration area.

11. The AN node according to claim 9, wherein the NSSAI contained in the second control message indicates a network slice identifier corresponding to the network slice.

12. The AN node according to claim 11, wherein the at least one processor is configured to select a cell, AN node or tracking area that supports the network slice as a target cell, target AN node or target tracking area to which the UE is handed over or redirected.

13. The AN node according to claim 11, wherein the at least one processor is configured to add a cell or AN node that supports the network slice, as the secondary cell or a secondary node of carrier aggregation or dual connectivity for the UE.

14. The AN node according to claim 9, wherein the second control message indicates an identifier of at least one of at least one particular tracking area in which the network slice is available.

15. The AN node according to claim 14, wherein the at least one processor is configured to select a cell belonging to at least one of the at least one particular tracking area or an AN node providing this cell, as a target cell or target AN node to which the UE is handed over or redirected.

16. The AN node according to claim 14, wherein the at least one processor is configured to add a cell belonging to at least one of the at least one particular tracking area or an AN node providing this cell, as the secondary cell or a secondary node of carrier aggregation or dual connectivity for the UE.

17. The AN node according to claim 9, wherein the second control message indicates an identifier of at least one of at least one particular cell in which the network slice is available.

18. The AN node according to claim 17, wherein the at least one processor is configured to select any of the at least one particular cell or an AN node providing this cell, as a target cell or target AN node to which the UE is handed over or redirected.

19. The AN node according to claim 17, wherein the at least one processor is configured to add any of the at least one particular cell or an AN node providing this cell, as the secondary cell or a secondary node of carrier aggregation or dual connectivity for the UE.

20. The AN node according to claim 9, wherein the second cell is provided by another AN node, and the at least one processor is configured to, in response to the second control message, hand over or redirect the UE to the another AN node, or send a message for requesting the another AN node to add the second cell as the secondary cell of carrier aggregation or dual connectivity for the UE.

21. A method performed by an Access and Mobility management Function (AMF) apparatus, the method comprising: receiving a first control message for registration, from a User Equipment (UE), via a first access network (AN) node that provides a first cell; and sending a second control message to the first AN node in response to receiving the first control message, the second control message including Network Slice Selection Assistance Information (NSSAI) to cause the first AN node to attempt to redirect the UE to a second cell that supports a network slice in the NSSAI, wherein the second control message includes a second information to determine a frequency band for the redirection of the UE.

22. A method performed by an access network (AN) node configured to provide a first cell, the method comprising: receiving a first control message sent from a User Equipment (UE) for registration; forwarding the first control message to a core network; receiving a second control message from the core network in response to sending the first control message, the second control message including Network Slice Selection Assistance Information (NSSAI) to cause the first AN node to attempt to redirect the UE to a second cell that supports a network slice in the NSSAI; and in response to the second control message, handing over or redirecting the UE to the second cell supporting the network slice in the NSSAI, wherein the second control message includes a second information to determine a frequency band for the redirection of the UE.

23. A method of a User Equipment (UE) comprising: sending a first control message for registration to an access network (AN) node that provides a first cell; and receiving a Radio Resource Control (RRC) release message including a first information used for redirection of the UE, in a case where a second control message including Network Slice Selection Assistance Information (NSSAI) to cause the AN node to attempt to redirect the UE to a second cell that supports a Single-Network Slice Selection Assistance Information (S-NSSAI) in the NSSAI is sent from an Access and Mobility management Function (AMF) to the AN node, wherein the second control message includes a second information to determine a frequency band for the redirection of the UE.

24. The method according to the claim 23, wherein the second control message is sent after the first control message for registration is sent.

25. A User Equipment (UE) comprising: at least one memory configured to store instructions; and at least one processor configured to execute the instructions to: send a first control message for registration to an access network (AN) node that provides a first cell; and receive a Radio Resource Control (RRC) release message including a first information used for redirection of the UE, in a case where a second control message including Network Slice Selection Assistance Information (NSSAI) to cause the AN node to attempt to redirect the UE to a second cell that supports a Single-Network Slice Selection Assistance Information (S-NSSAI) in the NSSAI is sent from an Access and Mobility management Function (AMF) to the AN node, wherein the second control message includes a second information to determine a frequency band for the redirection of the UE.

\* \* \* \* \*